(12) United States Patent
Teng et al.

(10) Patent No.: US 10,172,010 B2
(45) Date of Patent: Jan. 1, 2019

(54) ENHANCEMENTS FOR OPERATOR SPECTRUM SHARING

(71) Applicant: NOKIA SOLUTIONS AND NETWORKS OY, Espoo (FI)

(72) Inventors: Yong Teng, Beijing (CN); Kari Veikko Horneman, Oulu (FI); Xiao Tong, Shanghai (CN); Jiang Wang, Shanghai (CN); Jing Xu, Shanghai (CN)

(73) Assignee: Nokia Solutions and Networks Oy, Espoo (FI)

( * ) Notice: Subject to any disclaimer, the term of this patent is extended or adjusted under 35 U.S.C. 154(b) by 35 days.

(21) Appl. No.: 15/039,287

(22) PCT Filed: Nov. 29, 2013

(86) PCT No.: PCT/CN2013/088197
§ 371 (c)(1),
(2) Date: May 26, 2016

(87) PCT Pub. No.: WO2015/077995
PCT Pub. Date: Jun. 4, 2015

(65) Prior Publication Data
US 2017/0034708 A1 Feb. 2, 2017

(51) Int. Cl.
*H04W 16/14* (2009.01)
*H04W 72/04* (2009.01)
(52) U.S. Cl.
CPC ........... *H04W 16/14* (2013.01); *H04W 72/04* (2013.01)

(58) Field of Classification Search
None
See application file for complete search history.

(56) References Cited

U.S. PATENT DOCUMENTS

| 2009/0161617 A1* | 6/2009 | Abedi | H04W 16/10 |
| | | | 370/329 |
| 2010/0136989 A1* | 6/2010 | Westerberg | H04W 16/14 |
| | | | 455/450 |

(Continued)

FOREIGN PATENT DOCUMENTS

| EP | 2106171 A1 | 9/2009 |
| EP | 2229020 A1 | 9/2010 |

(Continued)

OTHER PUBLICATIONS

3GPP TS 36.423 V11.4.0, "3rd Generation Partnership Project; Technical Specification Group Radio Access Network; Evolved Universal Terrestrial Radio Access Network (E-UTRAN); X2 application protocol (X2AP) (Release 11)", Mar. 2013, 144 pgs.

(Continued)

*Primary Examiner* — Robert C Scheibel
(74) *Attorney, Agent, or Firm* — Brake Hughes Bellerman LLP

(57) ABSTRACT

A method including: receiving, at a first cell, radio resource information from a second cell, said first and second cells in at least one network controlled by two or more operators; receiving operator identity information and cell-type information at said first cell from said second cell; appending said operator identity information and said cell-type information to said radio resource information; and allocating radio resources in dependence on said information.

9 Claims, 17 Drawing Sheets

(56) References Cited

U.S. PATENT DOCUMENTS

| | | | |
|---|---|---|---|
| 2010/0216478 A1* | 8/2010 | Buddhikot | H04W 16/02 455/450 |
| 2011/0188481 A1* | 8/2011 | Damnjanovic | H04W 72/04 370/336 |
| 2012/0157095 A1* | 6/2012 | Fodor | H04W 4/08 455/434 |
| 2013/0090124 A1 | 4/2013 | Panchal et al. | |
| 2013/0163508 A1* | 6/2013 | Yu | H04W 16/14 370/315 |
| 2014/0135034 A1* | 5/2014 | Alpert | H04W 4/22 455/456.2 |
| 2015/0257039 A1* | 9/2015 | Horiuchi | H04W 28/16 370/329 |
| 2015/0289141 A1* | 10/2015 | Ghasemzadeh | H04W 16/14 370/330 |

FOREIGN PATENT DOCUMENTS

| | | | |
|---|---|---|---|
| WO | 2012028200 A1 | 3/2012 | |
| WO | 2012062483 A1 | 5/2012 | |

OTHER PUBLICATIONS

Aazhang, Behnaam et al., "Spectrum Sharing in a Cellular System", IEEE ISSSTA2004, Sydney, Australia, Aug. 30-Sep. 2, 2004, 4 pages.

Alcatel Shanghai Bell et al., 3GPP TSG-RAN WG1 #55, R1-084125, "Support of wider bandwidth for Home eNodeB in LTE-Advanced", Prague, Czech Republic, Nov. 10-14, 2008, 5 pages.

Anchora, Luca et al., "Capacity Gains due to Orthogonal Spectrum Sharing in Multi-Operator LTE Cellular Networks", IEEE, 2012 International Symposium on Wireless Communication Systems (ISWCS), 5 pages.

Heinonen, Ville et al., "Capacity Gains Through Inter-Operator Resource Sharing in a Cellular Network", The 11th International Symposium on Wireless Personal Multimedia Communications (WPMC'08), 2008, 5 pages.

Mazzenga, Franco et al., "Performance Evaluation of Spectrum Sharing Algorithms in Single and Multi Operator Scenarios", Vehicular Technology Conference (VTC Spring), 2011 IEEE 73rd, 5 pages.

Nokia Siemens Networks et al., 3GPP TSG RAN WG1 #54 Meeting, R1-083103, "Autonomous component carrier selection for LTE-Advanced", Jeju Island, Korea, Aug. 18-22, 2008, 4 pages.

Nokia Siemens Networks et al., 3GPP TSG RAN WG1 #55 Meeting R1-084321, "Algorithms and results for autonomous component carrier selection for LTE-Advanced", Prague, Czech Republic, Nov. 10-14, 2008, 5 pages.

Nokia Siemens Networks et al., 3GPP TSG RAN WG1 #56 Meeting, R1-090736, "Use of Background Interference Matrix for Autonomous Component Carrier Selection for LTE-Advanced", Athens, Greece, Feb. 9-13, 2009, 7 pages.

International Search Report and Written Opinion for International Application No. PCT/CN2013/088197, dated Aug. 22, 2014, 16 pages.

European Search Report for European Patent Application No. 13898061.0, dated Jun. 27, 2017, 8 pages.

Office Action for European Application No. 13898061.0, dated Jan. 15, 2018, 5 pages.

\* cited by examiner

ENHANCEMENTS FOR OPERATOR SPECTRUM SHARING

This application is a national stage entry of PCT Application No. PCT/CN2013/088197, filed Nov. 29, 2013, entitled "METHOD, APPARATUS AND COMPUTER PROGRAM" which is hereby incorporated by reference in its entirety.

The invention relates to a method, apparatus and computer program, and in particular but not exclusively to a method, apparatus and computer program for resource allocation.

A communication system can be seen as a facility that enables communication sessions between two or more entities such as fixed or mobile communication devices, base stations, servers and/or other communication nodes. A communication system and compatible communicating entities typically operate in accordance with a given standard or specification which sets out what the various entities associated with the system are permitted to do and how that should be achieved. For example, the standards, specifications and related protocols can define the manner how communication devices can access the communication system and how various aspects of communication shall be implemented between communicating devices. A communication can be carried on wired or wireless carriers. In a wireless communication system at least a part of the communication between at least two stations occurs over a wireless link.

Examples of wireless systems include public land mobile networks (PLMN) such as cellular networks, satellite based communication systems and different wireless local networks, for example wireless local area networks (WLAN). A wireless system can be divided into cells, and hence these are often referred to as cellular systems. A cell is provided by a base station. Cells can have different shapes and sizes. A cell can also be divided into sectors. Regardless of the shape and size of the cell providing access for a user equipment, and whether the access is provided via a sector of a cell or a cell, such area can be called radio service area or access area. Neighbouring radio service areas typically overlap, and thus a communication in an area can listen to more than one base station.

A user can access the communication system by means of an appropriate communication device. A communication device of a user is often referred to as user equipment (UE) or terminal. A communication device is provided with an appropriate signal receiving and transmitting arrangement for enabling communications with other parties. Typically a communication device is used for enabling receiving and transmission of communications such as speech and data. In wireless systems a communication device provides a transceiver station that can communicate with another communication device such as e.g. a base station of an access network and/or another user equipment. The communication device may access a carrier provided by a station, for example a base station, and transmit and/or receive communications on the carrier.

An example of communication systems attempting to satisfy the increased demands for capacity is an architecture that is being standardized by the 3rd Generation Partnership Project (3GPP). This system is often referred to as the long-term evolution (LTE) of the Universal Mobile Telecommunications System (UMTS) radio-access technology. The LTE aims to achieve various improvements, for example reduced latency, higher user data rates, improved system capacity and coverage, reduced cost for the operator and so on. A further development of the LTE is often referred to as LTE-Advanced. The various development stages of the 3GPP LTE specifications are referred to as releases.

In LTE-Advanced the network nodes can be wide area network nodes such as a macro eNodeB (eNB) which may, for example, provide coverage for an entire cell. Alternatively in LTE-Advanced, network nodes can be small area network nodes such as Home eNBs (HeNB) (femto cells) or pico eNodeBs (pico-eNB). HeNBs may be configured to support local offload and may support any UE or UEs belonging to a closed subscriber group (CSG) or an open subscriber group (OSG). Pico eNBs can, for example, be configured to extend the range of a cell. In some instances a combination of wide area network nodes and small area network nodes can be deployed using the same frequency carriers (e.g. co-channel deployment).

In a first aspect there is provided a method comprising: receiving, at a first cell, radio resource information from a second cell, said first and second cells in at least one network controlled by two or more operators; receiving operator identity information and cell-type information at said first cell from said second cell; appending said operator identity information and said cell-type information to said radio resource information; and allocating radio resources in dependence on said information.

Preferably said method comprises sending a request for said radio resource information, said request comprising an operator-identifier for identifying an operator for which information is required.

Preferably said radio resource information comprises at least one of spectrum allocation information and interference information.

Preferably said method comprises storing said radio resource information in at least one of a radio resource allocation table and a background interference matrix.

Preferably said cell-type information comprises information on a controller of said second cell.

Preferably said controller comprises one of: a small-cell base station; a macro-cell base station; a relay-node.

Preferably said method comprises carrying out radio resource measurements.

Preferably said first and second cells at least partially overlap.

Preferably said method is carried out in at least one of a centralised and a distributed manner.

Preferably said method is carried out in one or more of: a small-cell base station; a macro-cell base station; an operation and management node; a spectrum controller.

In a second aspect there is provided a computer program comprising computer executable instructions which when run on one or more processors perform the method of the first aspect.

In a third aspect there is provided a method comprising: performing, at a user equipment, radio resource measurements for at least one cell; sending said radio resource measurements to a further cell, wherein said at least one cell and said further cell are in at least one network controlled by two or more operators; and sending to said further cell operator-identity information and cell-type information of said first cell.

Preferably the method comprises receiving at said user equipment a request to carry out said radio resource measurements.

Preferably said request is received from said further cell.

Preferably said method comprises receiving from said first cell said operator-identity information and cell-type information of said first cell.

Preferably said radio resource measurements comprise at least one of spectrum allocation information and interference information.

Preferably said cell-type information comprises information on a controller of said at least one cell.

Preferably said controller comprises one of: a small-cell base station; a macro-cell base station; a relay-node.

Preferably said at least one cell and said further cell are at least partially overlapping with each other.

In a fourth aspect there is provided a computer program comprising computer executable instructions which when run on one or more processors perform the method of the third aspect.

In a fifth aspect there is provided an apparatus comprising at least one processor; and at least one memory including computer program code; the at least one memory and the computer program code configured to, with the at least one processor, cause the apparatus at least to: receive radio resource information from a second cell, said apparatus comprised in a first cell and said first and second cells in at least one network controlled by two or more operators; receive operator identity information and cell-type information from said second cell; append said operator identity information and said cell-type information to said radio resource information; and allocate radio resources in dependence on said information.

Preferably said apparatus is configured to send a request for said radio resource information, said request comprising an operator-identifier for identifying an operator for which information is required.

Preferably said radio resource information comprises at least one of spectrum allocation information and interference information.

Preferably said apparatus is configured to store said radio resource information in at least one of a radio resource allocation table and a background interference matrix.

Preferably said cell-type information comprises information on a controller of said second cell.

Preferably said controller comprises one of: a small-cell base station; a macro-cell base station; a relay-node.

Preferably said apparatus is configured to carry out radio resource measurements.

Preferably said first and second cells at least partially overlap.

Preferably said apparatus is configured to operate in at least one of a centralised and a distributed manner.

Preferably said apparatus comprises one of: a small-cell base station; a macro-cell base station; an operation and management node; a spectrum controller.

In a sixth aspect there is provided an apparatus comprising at least one processor; and at least one memory including computer program code; the at least one memory and the computer program code configured to, with the at least one processor, cause the apparatus at least to: perform radio resource measurements for at least one cell; send said radio resource measurements to a further cell, wherein said at least one cell and said further cell are in at least one network controlled by two or more operators; and send to said further cell operator-identity information and cell-type information of said at least one cell.

Preferably said apparatus is configured to receive a request to carry out said radio resource measurements.

Preferably said request is received from said further cell.

Preferably said apparatus is configured to receive from said at least one cell said operator-identity information and cell-type information of said at least one cell.

Preferably said radio resource measurements comprise at least one of spectrum allocation information and interference information.

Preferably said cell-type information comprises information on a controller of said at least one cell.

Preferably said controller comprises one of: a small-cell base station; a macro-cell base station; a relay-node.

Preferably said at least one cell and said further cell are at least partially overlapping with each other.

In a seventh aspect there is provided an apparatus comprising means for receiving radio resource information from a second cell, said apparatus comprised in a first cell and said first and second cells in at least one network controlled by two or more operators; means for receiving operator identity information and cell-type information from said second cell; means for appending said operator identity information and said cell-type information to said radio resource information; and means for allocating radio resources in dependence on said information.

Preferably said apparatus comprises means for sending a request for said radio resource information, said request comprising an operator-identifier for identifying an operator for which information is required.

Preferably said radio resource information comprises at least one of spectrum allocation information and interference information.

Preferably said apparatus comprises means for storing said radio resource information in at least one of a radio resource allocation table and a background interference matrix.

Preferably said cell-type information comprises information on a controller of said second cell.

Preferably said controller comprises one of: a small-cell base station; a macro-cell base station; a relay-node.

Preferably said apparatus comprises means for carrying out radio resource measurements.

Preferably said first and second cells at least partially overlap.

Preferably said apparatus comprises means for operating in at least one of a centralised and a distributed manner.

Preferably said apparatus comprises one of: a small-cell base station; a macro-cell base station; an operation and management node; a spectrum controller.

In an eighth aspect there is provided an apparatus comprising means for performing radio resource measurements for at least one cell; means for sending said radio resource measurements to a further cell, wherein said at least one cell and said further cell are in at least one network controlled by two or more operators; and means for sending to said further cell operator-identity information and cell-type information of said at least one cell.

Preferably said apparatus comprises means for receiving a request to carry out said radio resource measurements.

Preferably said request is received from said further cell.

Preferably said apparatus comprises means for receiving from said at least one cell said operator-identity information and cell-type information of said at least one cell.

Preferably said radio resource measurements comprise at least one of spectrum allocation information and interference information.

Preferably said cell-type information comprises information on a controller of said at least one cell.

Preferably said controller comprises one of: a small-cell base station; a macro-cell base station; a relay-node.

Preferably said at least one cell and said further cell are at least partially overlapping with each other.

Some embodiments will now be described by way of example only with reference to the following Figures in which.

Figure 4:
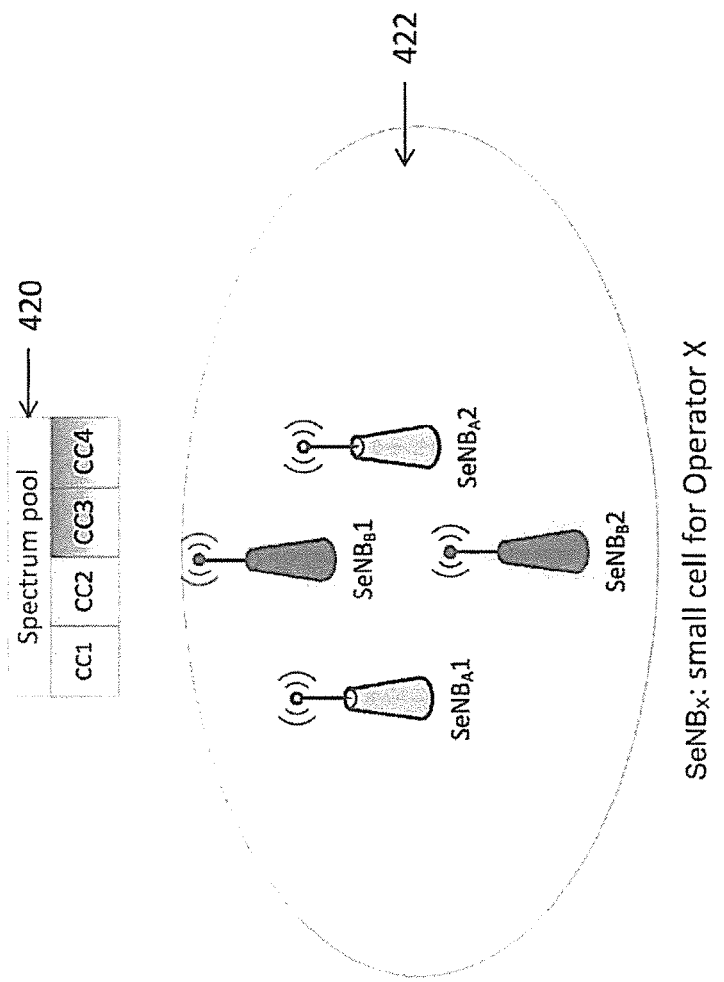
Figure 5:
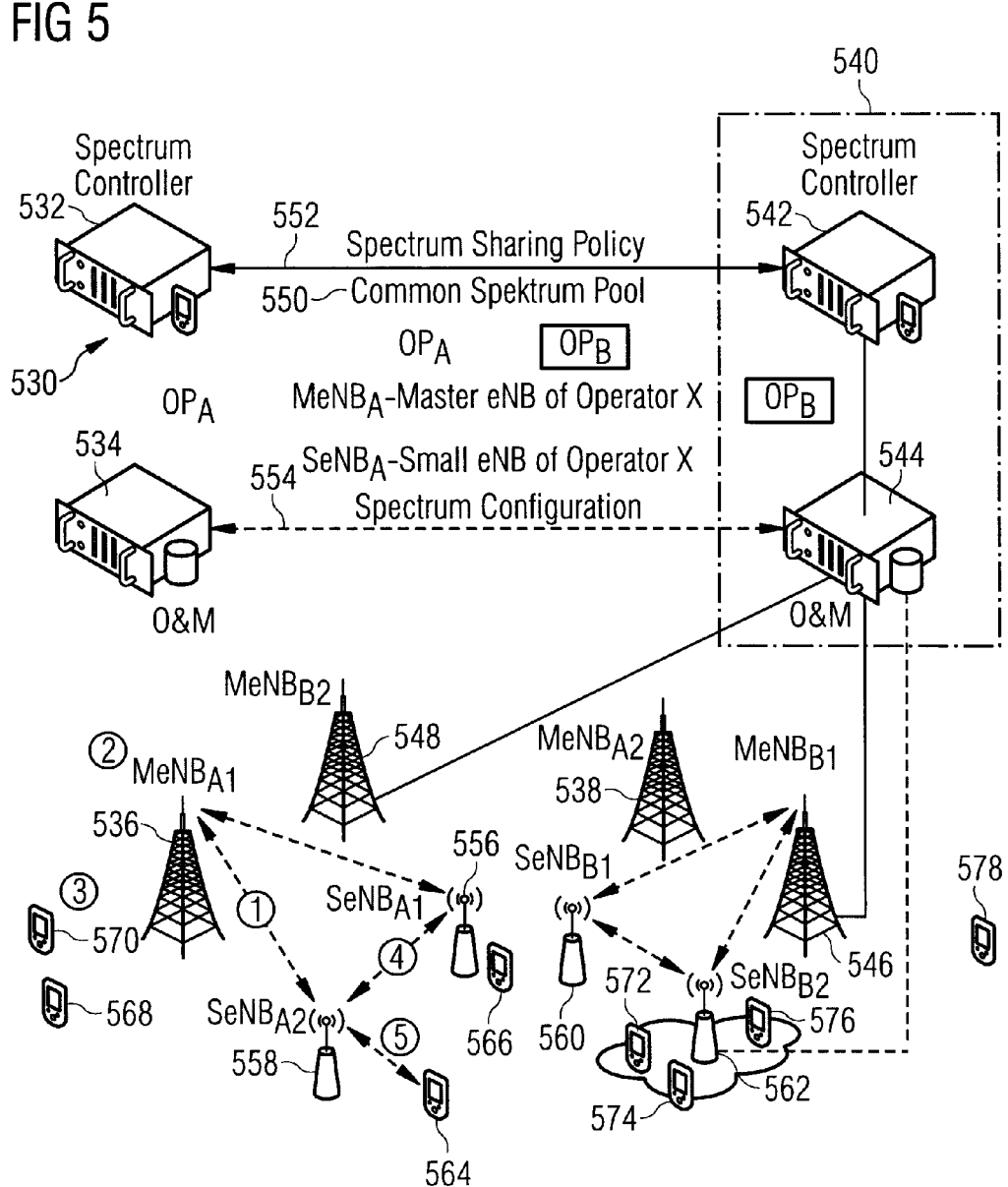
Figure 6:
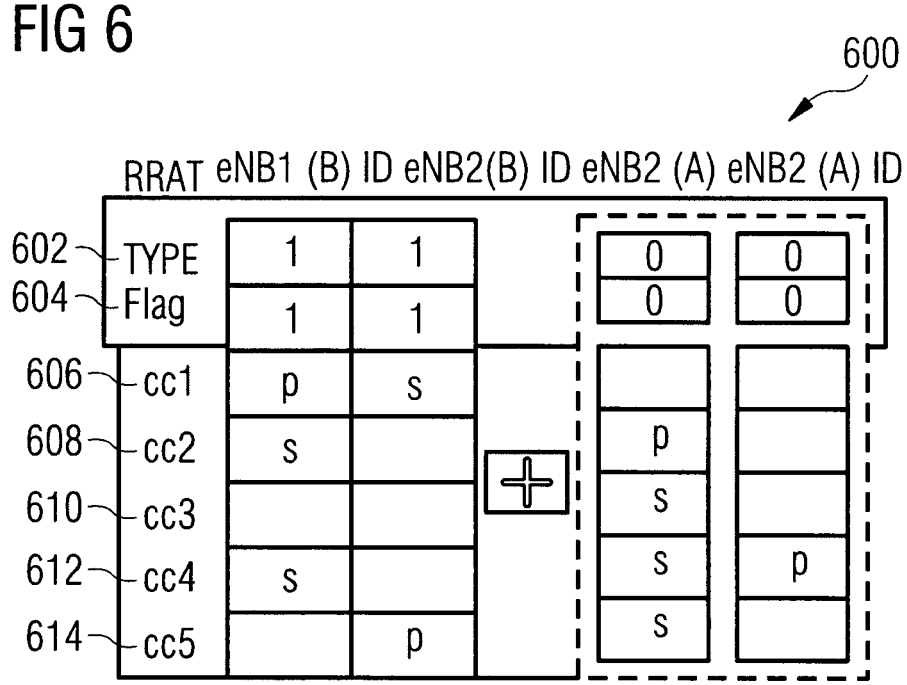
Figure 7:
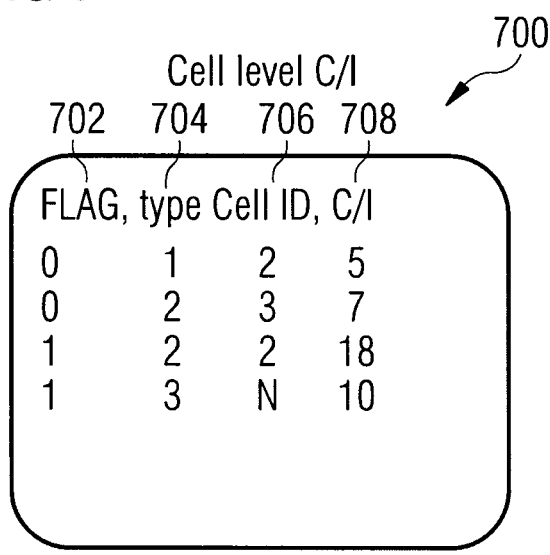
Figure 8:
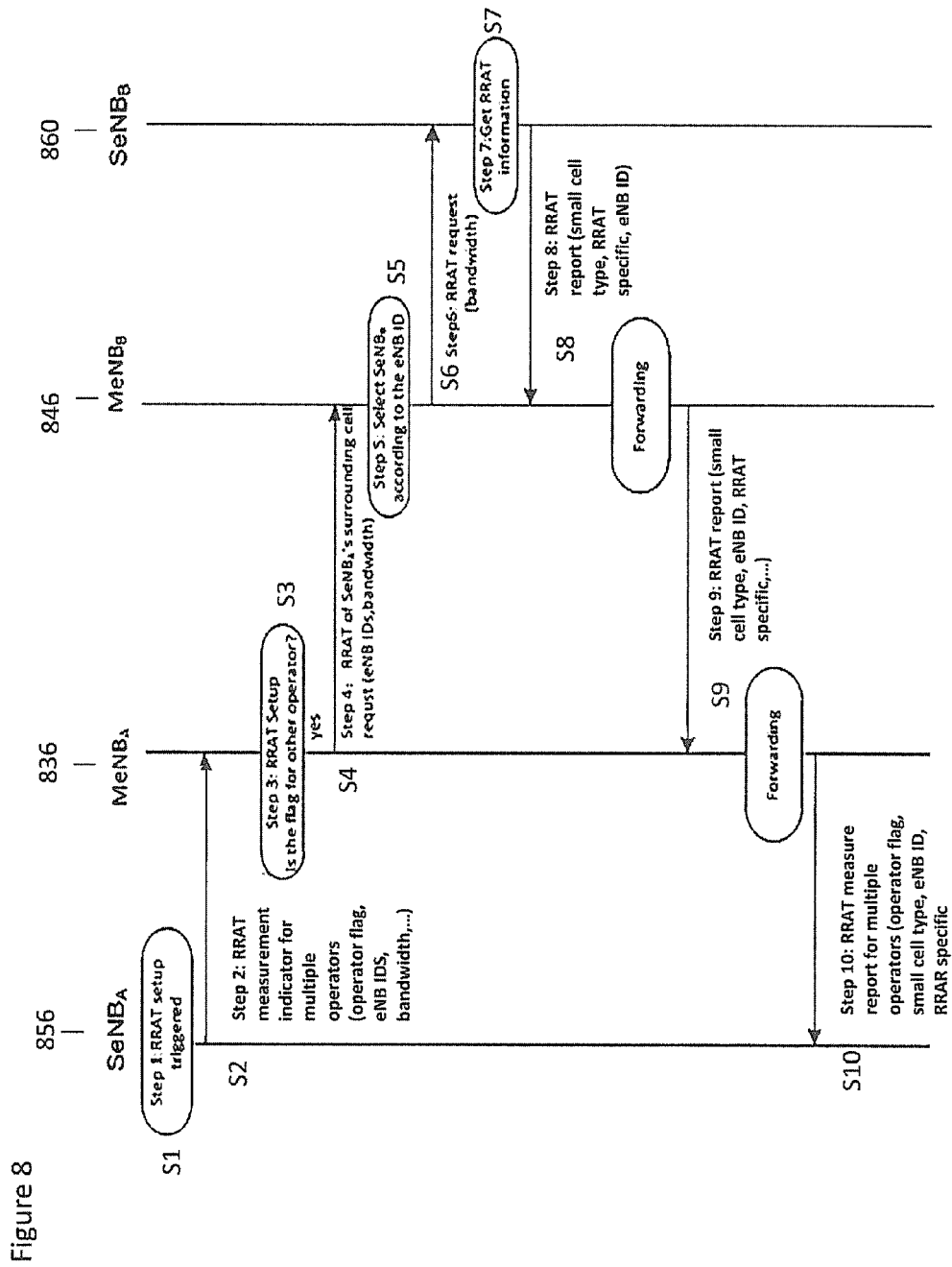
Figure 9:
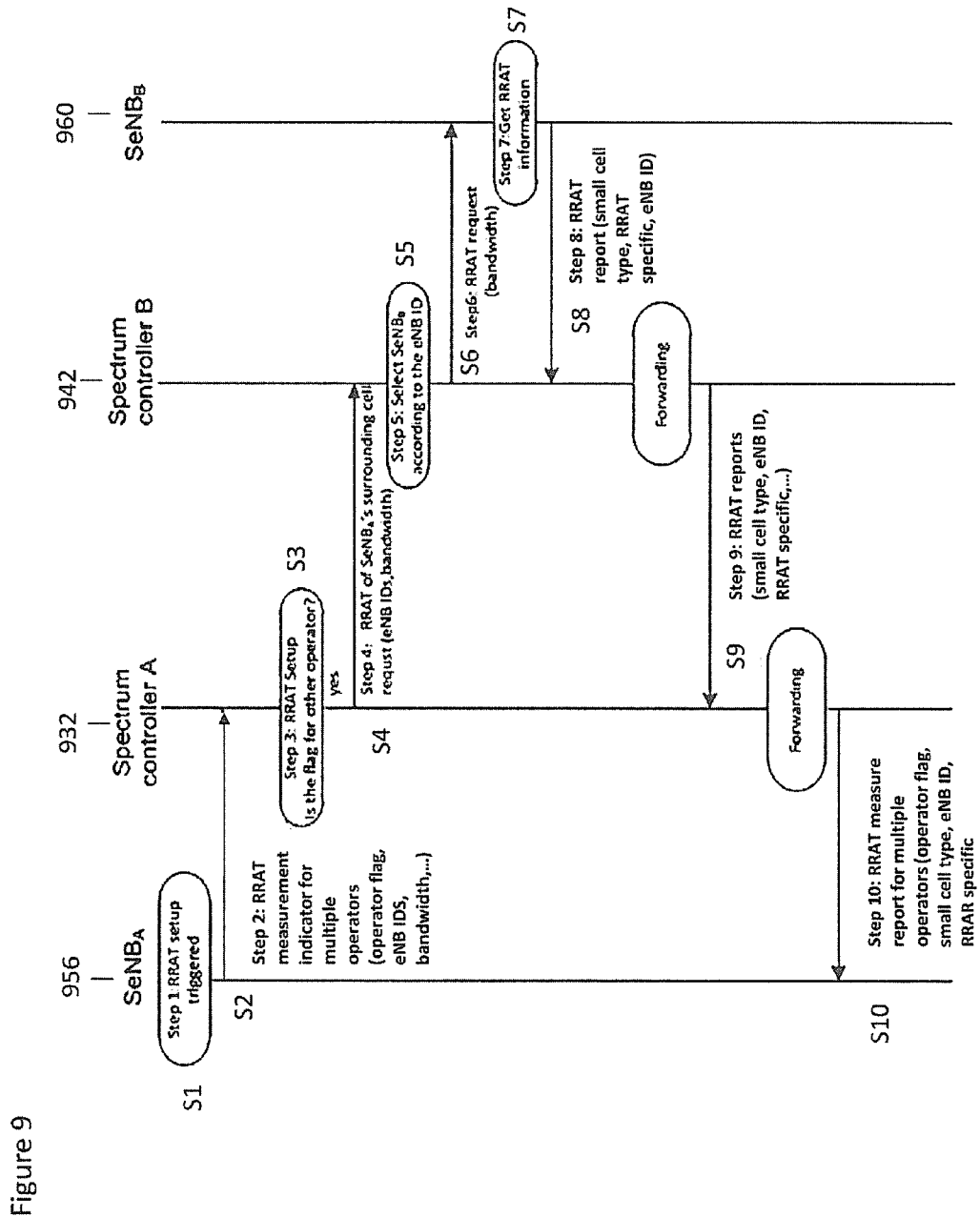
Figure 10:
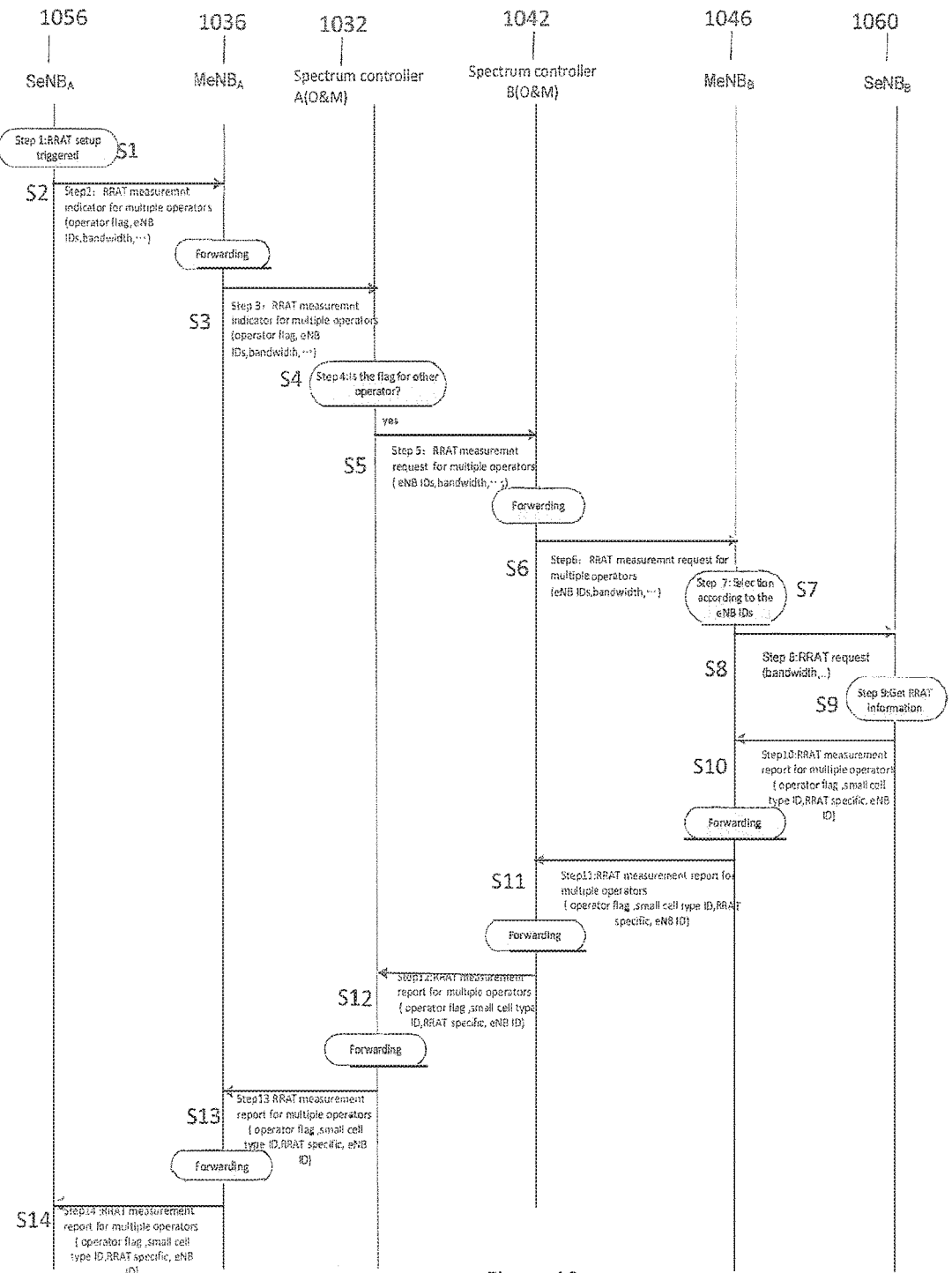
Figure 11:
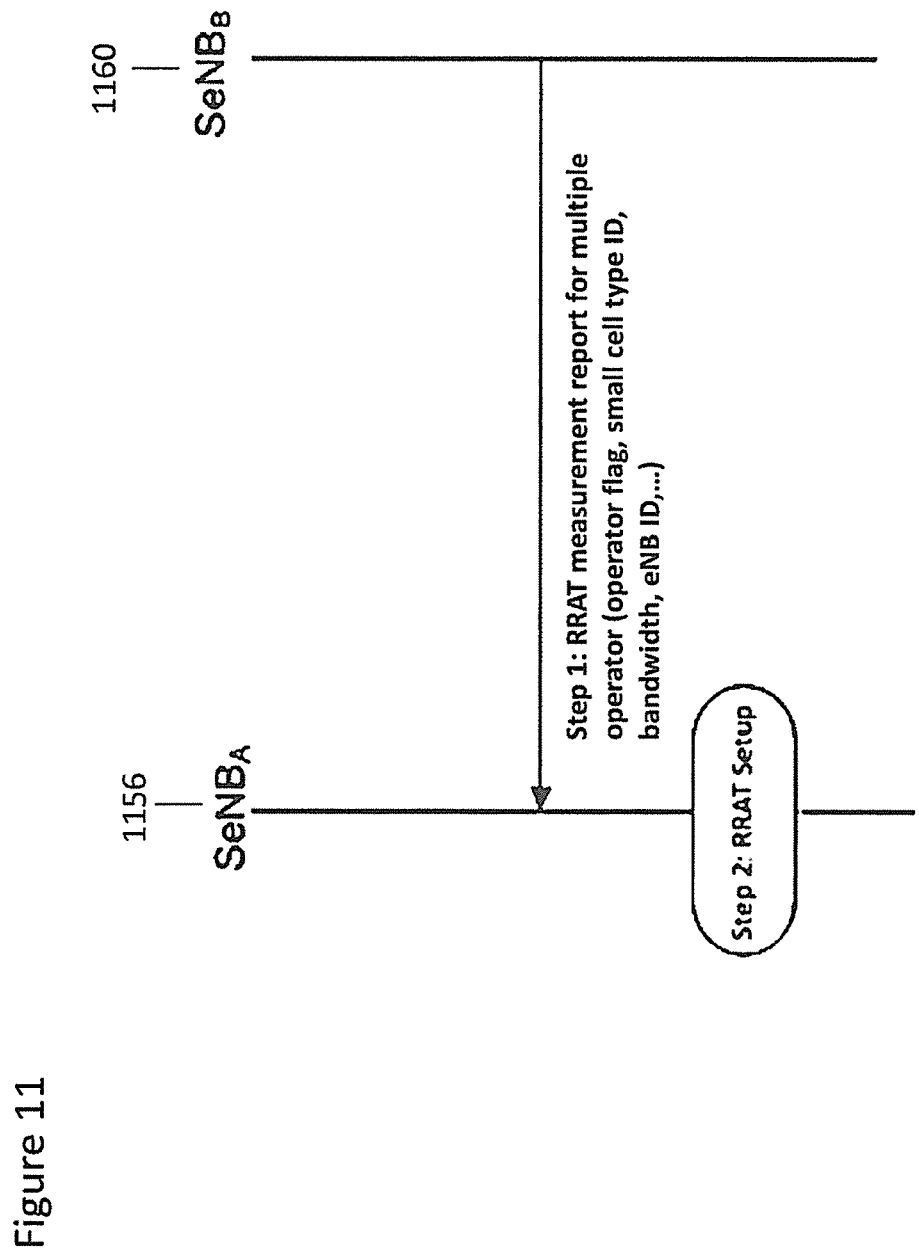
Figure 12:
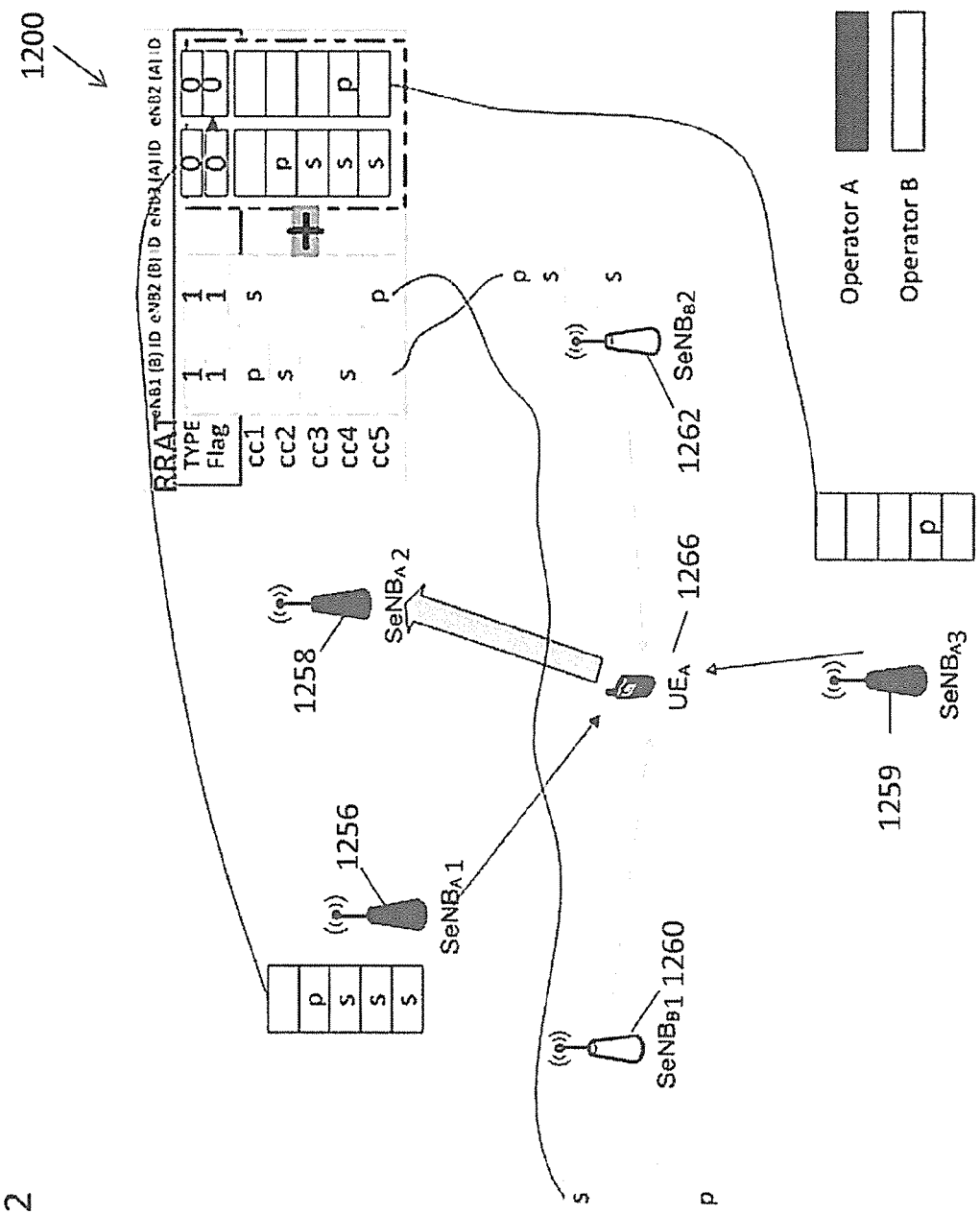
Figure 13:
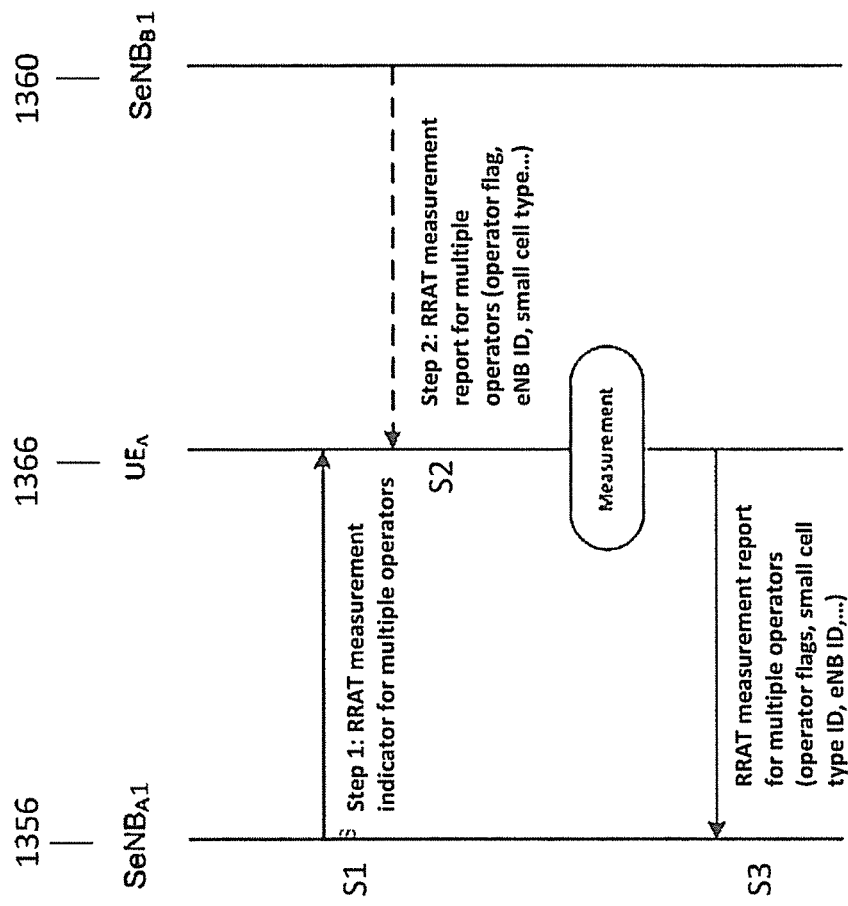
Figure 14:
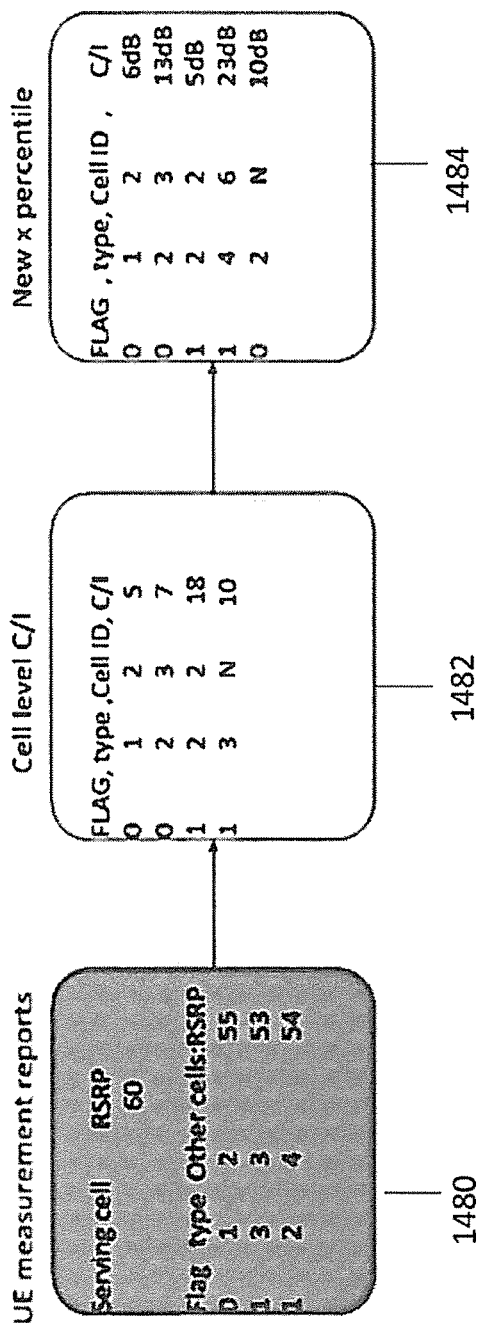
Figure 15:
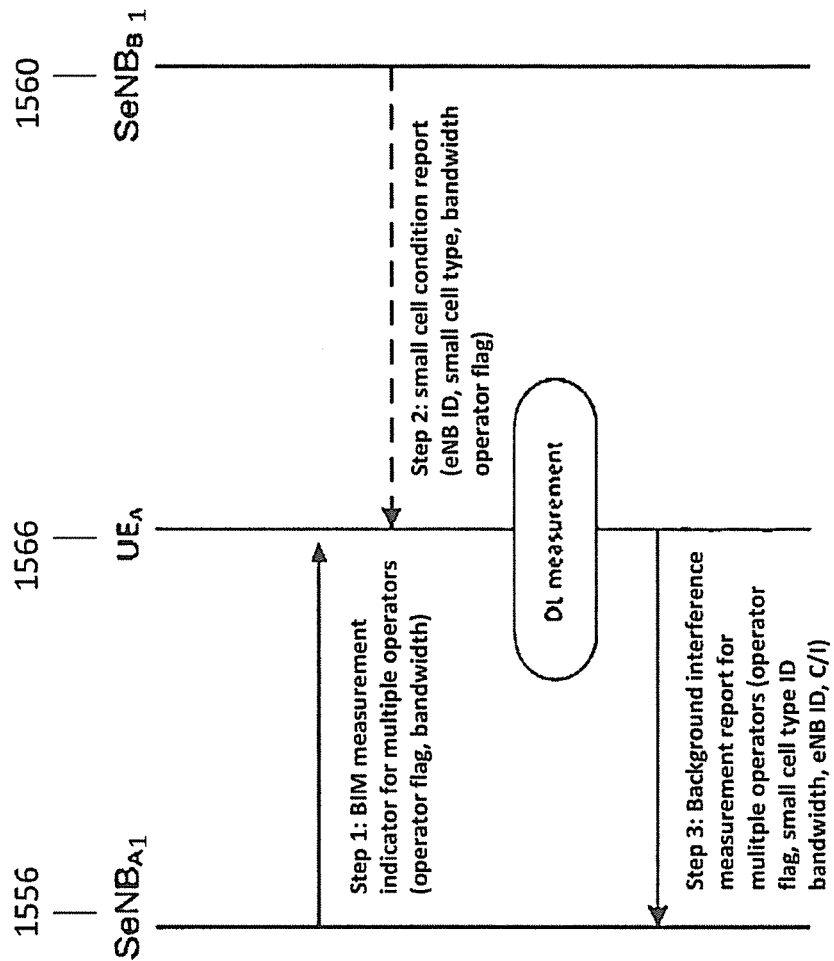
Figure 16:
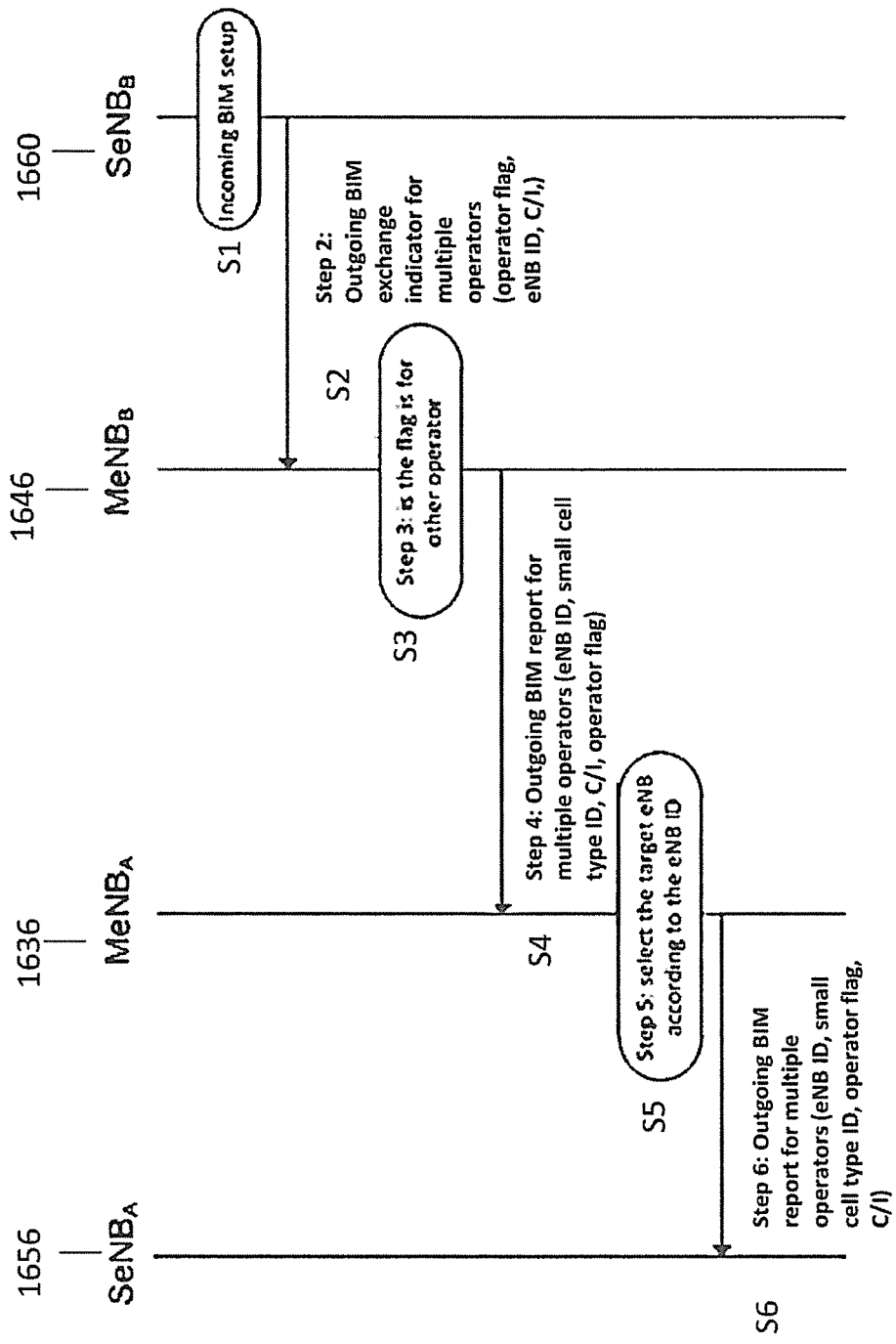
Figure 17:
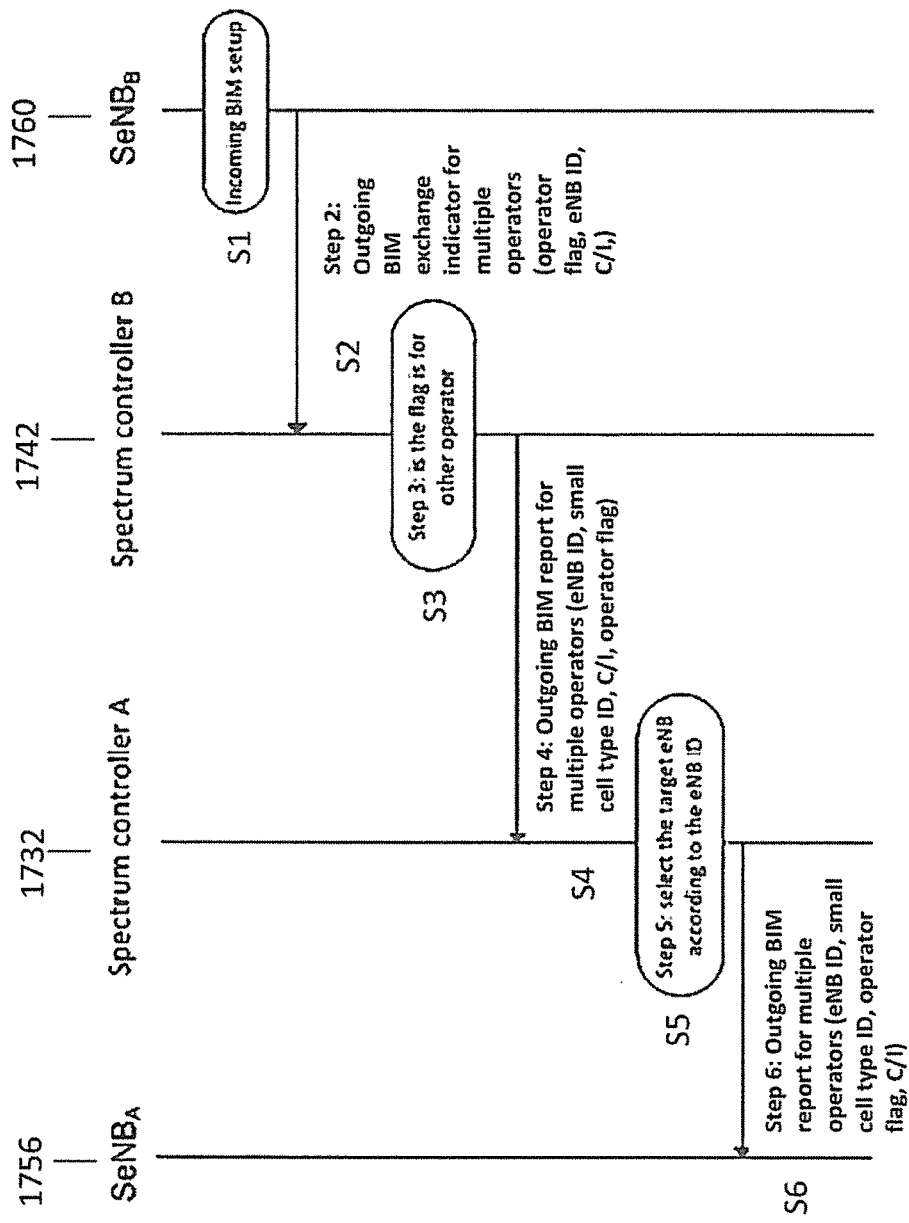
Figure 18:
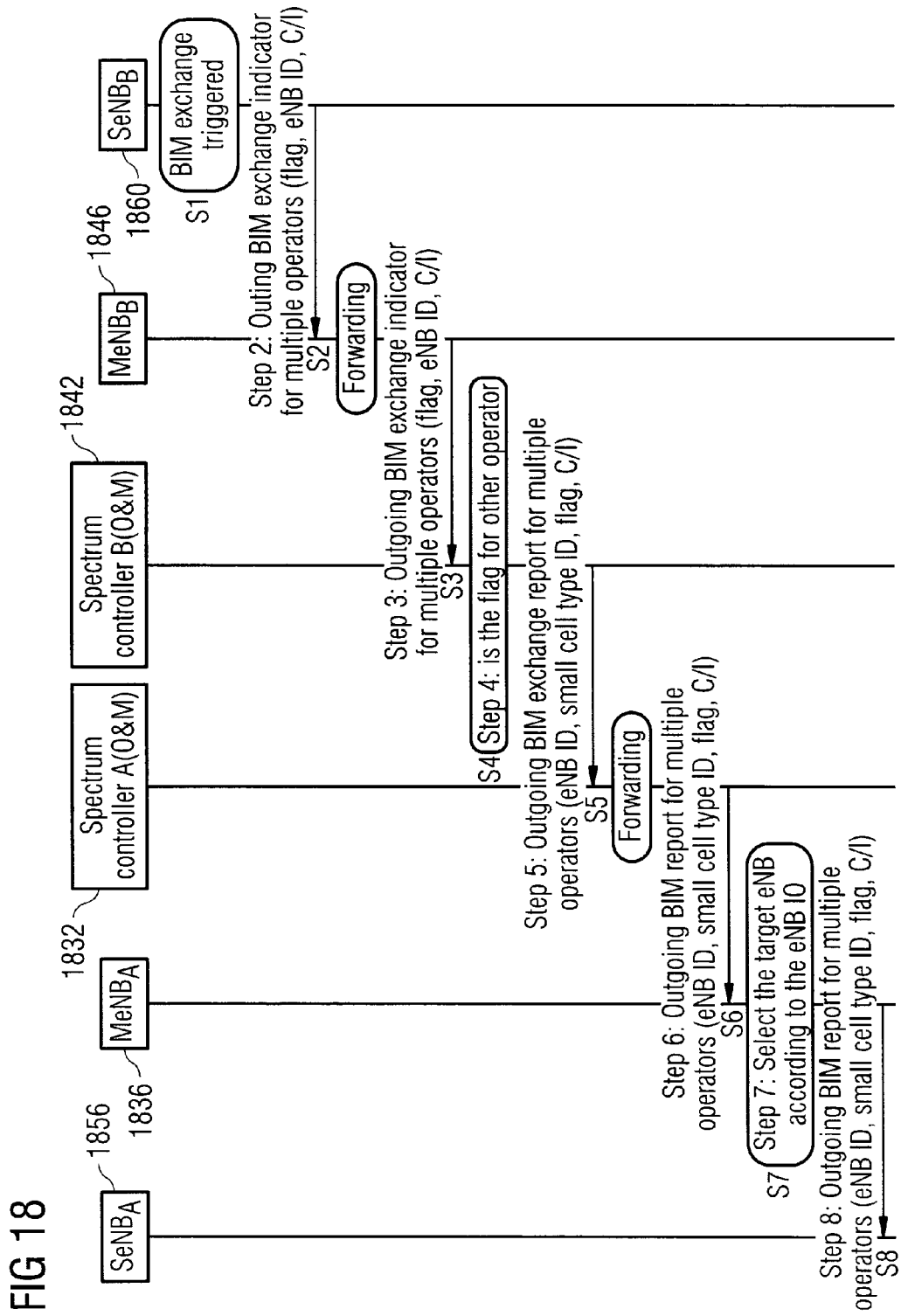
Figure 19:
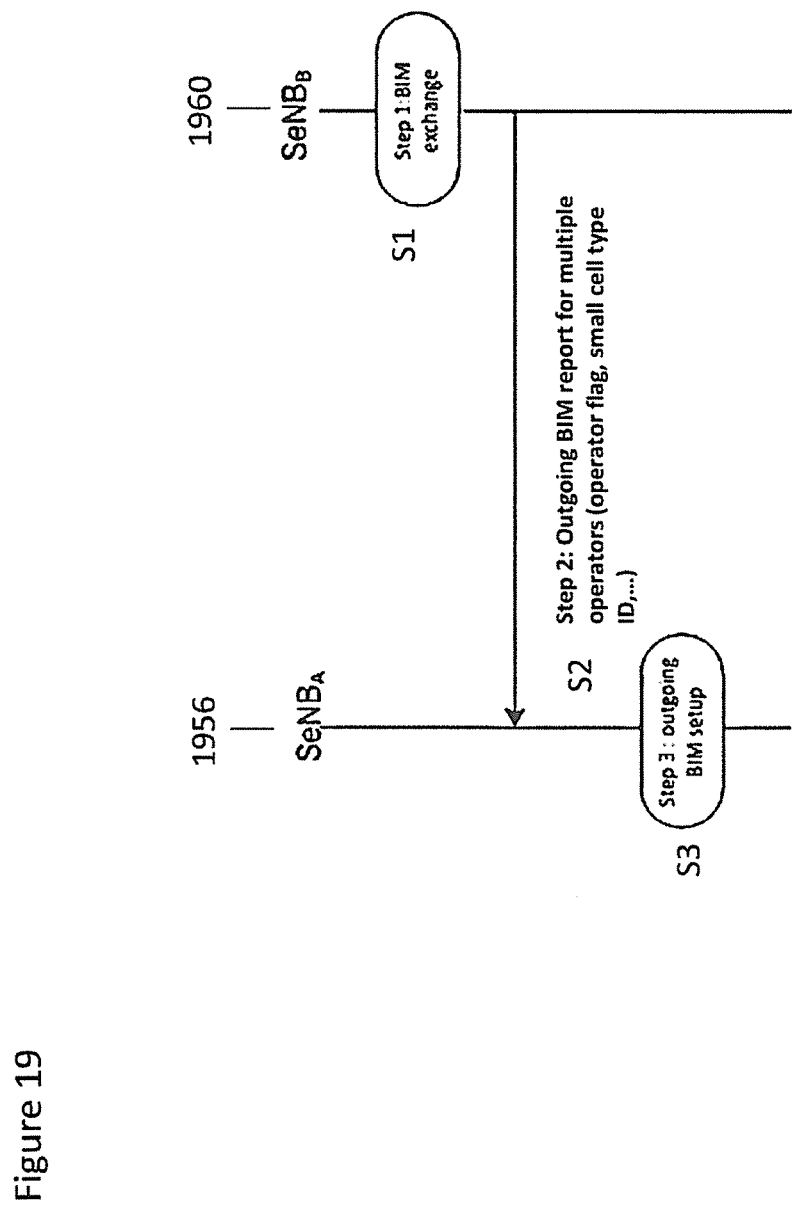

FIG. 4 demonstrates spectrum sharing for multiple operators in a local area;

FIG. 5 shows a framework for co-primary spectrum sharing according to an embodiment;

FIG. 6 shows a radio resource allocation table according to an embodiment;

FIG. 7 shows a background interference matrix according to an embodiment;

FIG. 8 is a flow chart of an embodiment according to a centralized policy;

FIG. 9 is a flow chart of another embodiment according to a centralized policy;

FIG. 10 is a flow chart of another embodiment according to a centralized policy;

FIG. 11 is a flow chart of an embodiment according to a distributed policy;

FIG. 12 shows a framework of another embodiment according to a distributed policy;

FIG. 13 is a flow chart of an embodiment in accordance with the framework of FIG. 12;

FIG. 14 shows a background interference matrix according to an embodiment;

FIG. 15 shows set-up of interference measurements according to an embodiment;

FIG. 16 shows reporting of interference measurements in a centralized policy according to an embodiment;

FIG. 17 shows reporting of interference measurements in a centralized policy according to an embodiment;

FIG. 18 shows reporting of interference measurements in a centralized policy according to an embodiment;

FIG. 19 shows reporting of interference measurements in a distributed policy according to an embodiment.

In the following certain exemplifying embodiments are explained with reference to a wireless or mobile communication system serving communication devices. Before explaining in detail the exemplifying embodiments, certain general principles of a wireless communication system, access systems thereof, and communication devices are briefly explained with reference to FIGS. 1 to 3 to assist in understanding the technology underlying the described examples.

Figure 1:
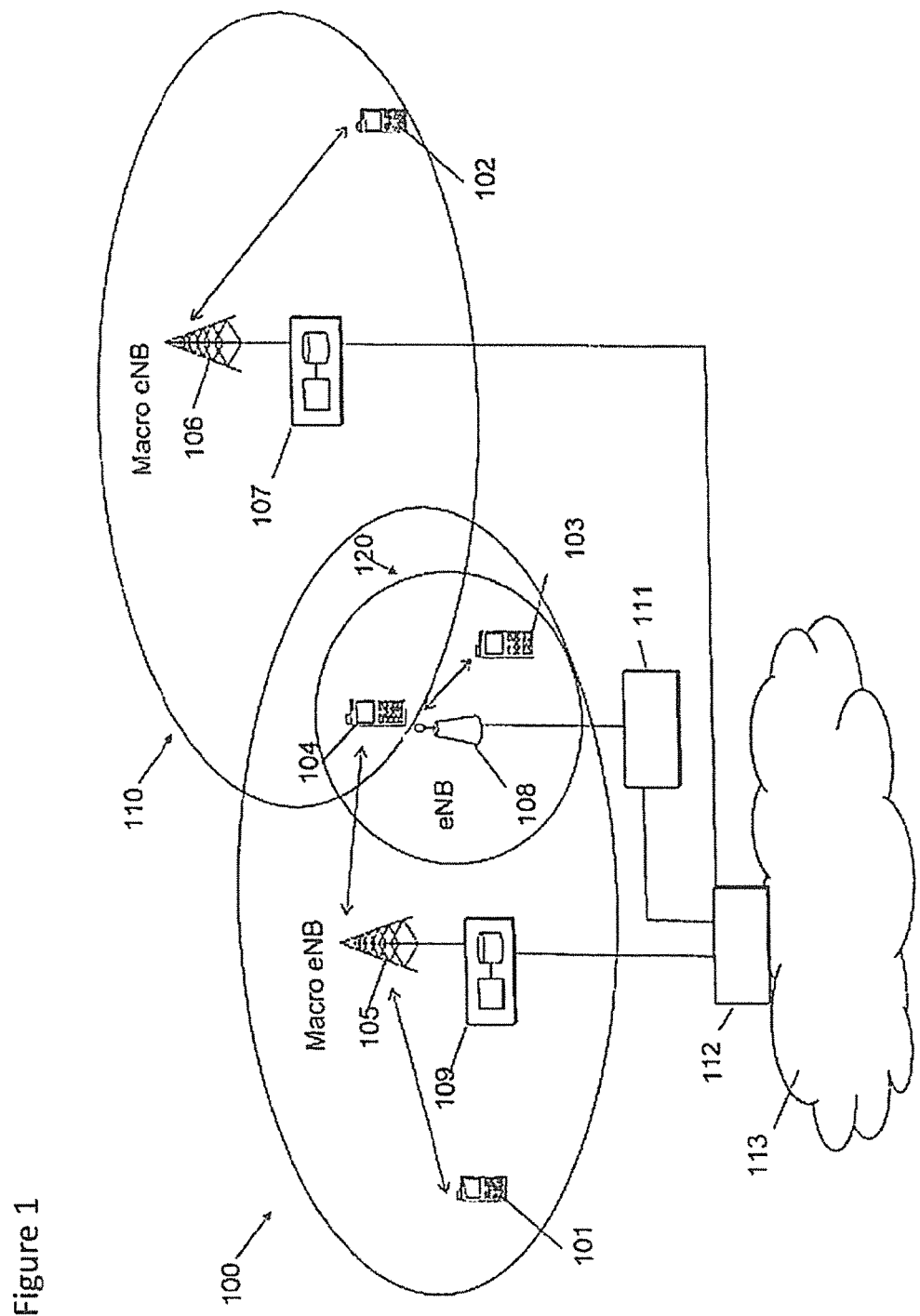
FIG. 1 shows a schematic diagram of a network according to some embodiments.

A communication device or user equipment 101, 102, 103, 104 is typically provided wireless access via at least one base station or similar wireless transmitter and/or receiver node of an access system. In FIG. 1 three neighbouring and overlapping access systems or radio service areas 100, 110 and 120 are shown being provided by base stations 105, 106, and 108.

However, it is noted that instead of three access systems, any number of access systems can be provided in a communication system. An access system can be provided by a cell of a cellular system or another system enabling a communication device to access a communication system. A base station site 105, 106, 108 can provide one or more cells. A base station can also provide a plurality of sectors, for example three radio sectors, each sector providing a cell or a subarea of a cell. All sectors within a cell can be served by the same base station. A radio link within a sector can be identified by a single logical identification belonging to that sector. Thus a base station can provide one or more radio service areas. Each communication device 101, 102, 103, 104, and base station 105, 106, and 108 may have one or more radio channels open at the same time and may send signals to and/or receive signals from more than one source.

Base stations 105, 106, 108 are typically controlled by at least one appropriate controller apparatus 109, 107 so as to enable operation thereof and management of communication devices 101, 102, 103, 104 in communication with the base stations 105, 106, 108. The control apparatus 107, 109 can be interconnected with other control entities. The control apparatus 109 can typically be provided with memory capacity 301 and at least one data processor 302. The control apparatus 109 and functions may be distributed between a plurality of control units. Although not shown in FIG. 1, in some embodiments each base station 105, 106 and 108 can comprise a control apparatus 109, 107.

The cell borders or edges are schematically shown for illustration purposes only in FIG. 1. It shall be understood that the sizes and shapes of the cells or other radio service areas may vary considerably from the similarly sized omnidirectional shapes of FIG. 1.

In particular, FIG. 1 depicts two wide area base stations 105, 106, which can be macro-eNBs 105, 106. The macro-eNBs 105, 106 transmit and receive data over the entire coverage of the cells 100 and 110 respectively. FIG. 1 also shows a smaller area base station or access point which in some embodiments can be a pico, a femto or Home eNB 108. The coverage of the smaller area base station 108 is generally smaller than the coverage of the wide area base stations 105, 106. The coverage provided by the smaller area node 108 overlaps with the coverage provided by the macro-eNBs 105, 106. Pico eNBs can be used to extend coverage of the macro-eNBs 105, 106 outside the original cell coverage 100, 110 of the macro-eNBs 105, 106. The pico eNB can also be used to provide cell coverage in "gaps" or "shadows" where there is no coverage within the existing cells 100, 110 and/or may serve "hot spots". In some embodiments, the smaller area node can be a femto or Home eNB which can provide coverage for a relatively small area such as the home. Some environments may have both pico and femto cells.

As shown, the radio service areas can overlap. Thus signals transmitted in an area can interfere with communications in another area (macro to macro, pico/femto to either one or both of the macro cells, and/or pico/femto to pico/femto).

The communication devices 101, 102, 103, 104 can access the communication system based on various access techniques, such as code division multiple access (CDMA), or wideband CDMA (WCDMA). Other examples include time division multiple access (TDMA), frequency division multiple access (FDMA) and various schemes thereof such as the interleaved frequency division multiple access (IFDMA), single carrier frequency division multiple access (SC-FDMA) and orthogonal frequency division multiple access (OFDMA), space division multiple access (SDMA) and so on.

Some non-limiting examples of the recent developments in communication systems are the long-term evolution (LTE) of the Universal Mobile Telecommunications System (UMTS) that is being standardized by the 3rd Generation Partnership Project (3GPP). As explained above, further development of the LTE is referred to as LTE-Advanced. Non-limiting examples of appropriate access nodes are a base station of a cellular system, for example what is known as NodeB (NB) in the vocabulary of the 3GPP specifications. The LTE employs a mobile architecture known as the Evolved Universal Terrestrial Radio Access Network (E-UTRAN). Base stations of such systems are known as evolved Node Bs (eNBs) and may provide E-UTRAN features such as user plane Radio Link Control/Medium Access Control/Physical layer protocol (RLC/MAC/PHY) and control plane Radio Resource Control (RRC) protocol terminations towards the user devices. Other examples of radio access systems include those provided by base stations of systems that are based on technologies such as wireless local area network (WLAN) and/or WiMax (Worldwide Interoperability for Microwave Access).

In FIG. 1 the base stations 105, 106, 108 of the access systems can be connected to a wider communications network 113. A controller apparatus 107, 109 may be provided for coordinating the operation of the access systems. A gateway function 112 may also be provided to connect to another network via the network 113. The smaller area base station 108 can also be connected to the other network by a separate gateway function 111. The base stations 105, 106, 108 can be connected to each other by a communication link for sending and receiving data. The communication link can be any suitable means for sending and receiving data between the base stations 105, 106 and 108 and in some embodiments the communication link is an X2 link.

The other network may be any appropriate network. A wider communication system may thus be provided by one or more interconnect networks and the elements thereof, and one or more gateways may be provided for interconnecting various networks.

Figure 2:
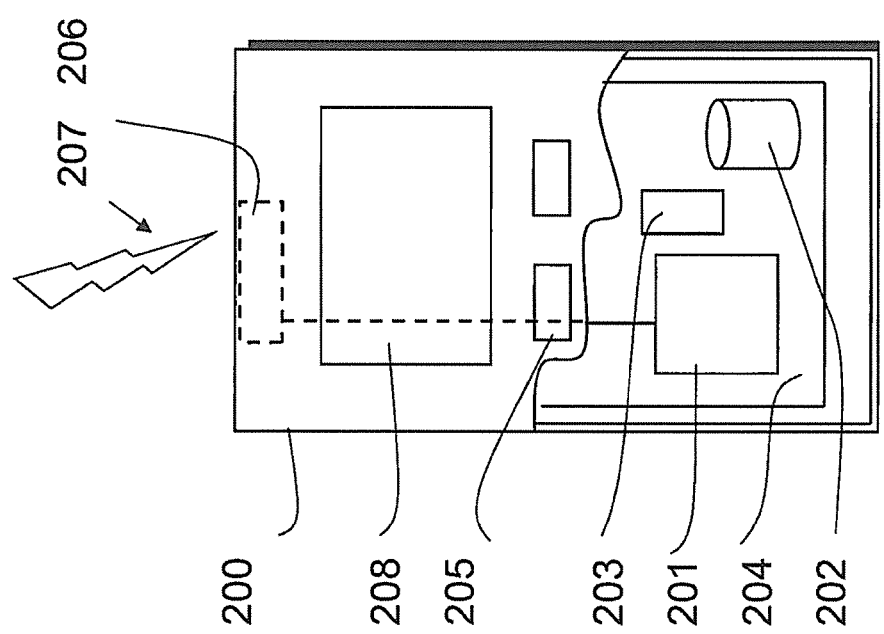
FIG. 2 shows a schematic diagram of a communication device according to some embodiments.

The communication devices will now be described in more detail with reference to FIG. 2. FIG. 2 shows a schematic, partially sectioned view of a communication device 101 that a user can use for communication. Of course the other communication devices shown in FIG. 1 may have the same or similar features. Such a communication device is often referred to as user equipment (UE) or terminal. An appropriate communication device may be provided by any device capable of sending and receiving radio signals. The communication device may be mobile or may be generally stationary. Non-limiting examples include a mobile station (MS) such as a mobile phone or what is known as a 'smart phone', a portable computer provided with a wireless interface card or other wireless interface facility, personal data assistant (PDA) provided with wireless communication capabilities, a computer or any combinations of these or the like.

A communication device may provide, for example, communication of data for carrying communications such as voice, electronic mail (email), text message, multimedia and so on. Users may thus be offered and provided numerous services via their communication devices. Non-limiting examples of these services include two-way or multi-way calls, data communication or multimedia services or simply an access to a data communications network system, such as the Internet. User may also be provided broadcast or multicast data. Non-limiting examples of the content include downloads, television and radio programs, videos, advertisements, various alerts and other information.

The device 101 may receive signals over an air interface 207 via appropriate apparatus for receiving and may transmit signals via appropriate apparatus for transmitting radio signals. In FIG. 2 transceiver apparatus is designated schematically by block 206. The transceiver apparatus 206 may be provided for example by means of a radio part and associated antenna arrangement. The antenna arrangement may be arranged internally or externally to the communication device.

The communication device is also typically provided with at least one data processing entity 201, at least one memory 202 and other possible components 203 for use in software and hardware aided execution of tasks it is designed to perform, including control of access to and communications with access systems and other communication devices. The data processing, storage and other relevant control apparatus can be provided on an appropriate circuit board and/or in chipsets. This feature is denoted by reference 204.

The user may control the operation of the communication device by means of a suitable user interface such as key pad 205, voice commands, touch sensitive screen or pad, combinations thereof or the like. A display 208, a speaker and a microphone can be also provided. Furthermore, a communication device may comprise appropriate connectors (either wired or wireless) to other devices and/or for connecting external accessories, for example hands-free equipment, thereto.

Figure 3:
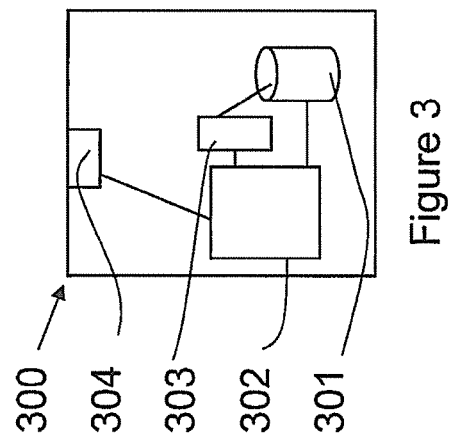
FIG. 3 shows a schematic diagram of a control apparatus according to some embodiments.

FIG. 3 shows an example of a control apparatus 109 for a communication system, for example to be coupled to and/or for controlling a station of an access system. In some embodiments the base stations 105, 106, and 108 comprise a control apparatus 109. In some embodiments, each base station will have a control apparatus. In other embodiments the control apparatus can be another network element. The control apparatus 109 can be arranged to provide control of communications by communication devices that are in the service area of the system. The control apparatus 109 can be configured to provide control functions in association with generation and communication of transmission patterns and other related information by means of the data processing facility in accordance with certain embodiments described below. For this purpose the control apparatus 109 comprises at least one memory 301, at least one data processing unit 302, 303 and an input/output interface 304. Via the interface the control apparatus can be coupled to a receiver and a transmitter of the base station. The control apparatus 109 can be configured to execute an appropriate software code to provide the control functions.

In a mobile communication system resources, such as available frequencies, can be allocated to different users, or nodes, or cells. This is known as spectrum allocation. Spectrum allocation can be static or dynamic. In static spectrum allocation the available frequencies (or other resources) are allocated in a time and space invariant manner. Accordingly static spectrum allocation may lead to resource wastage. In dynamic spectrum allocation the spectrum can be allocated in a manner that varies over time, for example to take in to account factors such as cell-loading.

The issue of spectrum licensing and the high cost associated with it are factors for research activities for more dynamic spectrum allocation. Multi-operator spectrum sharing, such as sharing on a co-primary basis, has been considered a possible way to improve spectrum efficiency which can solve the increasing demand. In a co-primary spectrum sharing scenario, operators share the same spectrum slot either with dedicated spectrum band for each operator or on a spectrum-pool basis, or a combination of both. The allocation of spectrum band for each operator may depend on time and location. In current network deployments, the coexistence of multiple operators in adjacent areas is quite common. The interest in this particular scenario has been increasing in recent years from both academic and industrial points of view. Dynamic frequency management is considered to be beneficial for the uncoordinated self-deployment of small cells in LTE-A heterogeneous networks.

Co-primary spectrum-sharing may lead to new challenges. In FIG. 4 a spectrum pool is shown schematically at 420. The spectrum pool 420 comprises component carriers CC1, CC2, CC3 and CC4. In this example a cell 422 comprises small base stations (or "home", "micro", "pico" or "femto" base stations) $SeNB_A1$, $SeNB_A2$, $SeNB_B1$ and $SeNB_B2$ which share a common spectrum. That is $SeNB_A1$, $SeNB_A2$, $SeNB_B1$ and $SeNB_B2$ can select all four component carriers (CC) from spectrum pool 420 if needed. However this method may add extra interference for small cells belonging to different operators. Interference is generally of concern as it may result in performance degradation, which may be severe, when component carriers are poorly selected. The intra-operator resource allocation methods may not be directly utilized in the inter-operator cases.

As discussed above there are several small cell types, such as pico, relay and femtocell. Different cell types may have different cell size, ports and transmitting power. In traditional spectrum sharing methods, the "small" cell type has not been taken into consideration. The amount of information exchanged for diverse small cells are also different. If all types of small cell share spectrum in a common pool, it may cause complex interference. For instance, if relays and femtocells use the same common channel, interference between relay and femtocell is different from the interference between relays or between femtocells.

In 3GPP Tdoc R1-083103, "Autonomous component carrier selection for LTE-Advanced", Nokia Siemens Networks, Nokia; 3GPP Tdoc R1-084321, "Algorithms and results for autonomous component carrier selection for LTE-Advanced", Nokia Siemens Networks, Nokia; and 3GPP Tdoc R1-084125, "Support for wider bandwidth for Home eNodeB in LTE-Advanced", Alcatel Shanghai Bell, Alcatel-Lucent, it is reported that uncoordinated deployment of eNBs in local area environments may benefit from supporting dynamic frequency re-use mechanisms. Such schemes may be named "autonomous component carrier selection (ACCS)" or "dynamic management of frequency band resources", for example. Both of these terms generally refer to the type of scheme where each eNB is dynamically selected to use only a subset of the available component carriers.

In 3GPP TSG RAN WG1 #56 Meeting R1-090736, a radio resource allocation table (RRAT) and background interference matrix (BIM) are defined for ACCS. The RRAT is a table that may be stored, for example, at the SeNB or the MeNB and enables the SeNB and/or MeNB to keep track of how the radio resources have been allocated. The RRAT can be dynamically updated in real-time and enables each node (e.g. SeNB and/or MeNB) to have a "current" view of the radio resource allocation. In this document the two tables are for single-operator spectrum reuse, but not suitable for a co-primary scenario. The BIM is used by the base stations to determine if that base station is allowed to take additional component carriers into use without experiencing or causing excessively low signal to interference plus noise ratio (SINR) in evaluating the base station as well as any surrounding cells using the same component carrier.

Some researchers have focused on inter-operator spectrum sharing in cellular networks as a possible way to face the increasing demand. In particular, concepts such as "sharing as a last resort", "always connected to the least loaded" and "sharing as a secondary user" have been evaluated and compared with the non-sharing case.

There may be some disadvantages with the above methods.

Some embodiments, as will be described further below, may provide a mechanism for spectrum sharing in co-primary sharing scenarios. In a co-primary scenario the different operators have equal access to use the available radio resources. Sharing on a co-primary basis may be described as meaning the nature of a right granted to the holder of a Radio Spectrum License to use the specified frequencies, subject to the condition that the licensee shall coordinate with other Co-Primary licensees to limit Harmful Interference to existing links and services operating in the relevant frequency bands, and facilitate the introduction of additional links and services in the relevant frequency bands. The co-primary licensees could be mobile network operators sharing the frequency bands only among themselves or other communication or wireless services.

Some confusion and conflicts for recognizing small cells which belong to different operators may occur according to current assumptions. Therefore according to some embodiments an "operator flag" may be adopted, together with Physical Cell-ID (PCI). In addition, different small-cell types may have different communication link, backhaul capability, cell size and different levels for sharing their resource(s). The interference caused by small cells of different types may be different within a spectrum common pool. Small cell types may improve the network throughput and lower the cell-edge interference. To enhance co-primary spectrum sharing, the Radio Resource Allocation Table (RRAT) and Background Interference Matrix (BIM) referred to above may be enhanced, and information including "operator flag" and "small cell type" may be added. This information may be useful for resource/spectrum allocation in co-primary spectrum sharing scenarios. The new signaling messages defined may also be applicable to other scenarios, such as SON network, cell cluster estimating, neighbour relative table (NRT) and other spectrum allocation algorithms.

FIG. 5 shows a framework for co-primary spectrum sharing according to one embodiment. Operator A, shown generally at 530, comprises spectrum controller 532 and Operation and Management (O&M) apparatus 534. Operator A controls $MeNB_{A1}$ denoted by 536, and $MeNB_{A2}$ denoted by 538. Operator B, shown generally at 540 comprises spectrum controller 542 and O&M apparatus 544. Operator B controls $MeNB_{B1}$ denoted by 546, and $MeNB_{B2}$ denoted by 548. Operator A and Operator B may share resources from a common spectrum pool 550. The spectrum controller and O&M provide spectrum sharing policy and configuration to help SeNBs or MeNBs share the spectrum. This sharing of information is shown by arrows 552 and 554.

$MeNB_{A1}$ 536 controls $SeNB_{A1}$ denoted by 556 and $SeNB_{A2}$ denoted by 558.

$MeNB_{B1}$ 546 controls $SeNB_{B1}$ denoted by 560 and $SeNB_{A2}$ denoted by 562.

This particular embodiment also comprises UEs 564, 566, 568, 570, 572, 574, 576 and 578. UE 564 is located in a small cell controlled by $SeNB_{A2}$ 558, and UE 566 is located in a small cell controlled by $SeNB_{A1}$ 556. UEs 572, 574 and 576 are each in small cells controlled by $SeNB_{B2}$ 562.

It will be understood that the framework shown in FIG. 5 is by way of example only and there may be more than two operators. There may also be more than one network. There may also be more/fewer MeNBs, SeNBs and UEs. Also, the location of these nodes in relation to each other may vary between embodiments. It will also be appreciated that the UE may move and accordingly connect to or disconnect from various networks, operators, MeNBs and SeNBs.

As discussed above, embodiments utilize radio resource allocation and background interference information. This information may be stored in tabular and/or matrix form. Accordingly some embodiments comprise a Radio Resource Allocation Table (RRAT), and a Background Interference Matrix (BIM). In embodiments the RRAT and BIM are stored at the MeNB and/or SeNB level. However The RRAT and BIM could also be stores at the UE or operator level.

FIG. 6 shows an example of a RRAT, shown generally at 600. This may be stored in the memory of the MeNB and/or SeNB. In this embodiment the RRAT comprises information relating to four base stations: eNB1(B), eNB2(B), eNB3(A) and eNB4(A). The table comprises a "type" field 602 and a "flag" field 604. The "type" field can be used to signify the type the relevant base station is e.g. macro, femto, relay etc. The "flag" field can be used to signify which operator the base station is associated with. In this embodiment numbers e.g. "0", "1" etc. are used to represent different base station types and different operators. For example a "0" could signify a macro base station and a "1" could signify a femto base station and vice versa. Likewise a "0" could signify a first operator and a "1" could signify a second operator. The flag and type fields are discussed in more detail below. The table also comprises Component Carrier (CC) fields 606, 608, 610, 612 and 614. The component carriers are designated either as primary ("P") or secondary ("S"). The RRAT 600 of FIG. 6 is by way of example only and may comprise entries for more or fewer base stations. Each field may also use differentiators other than numbers.

An example of a background interference matrix (BIM) is shown in FIG. 7. The BIM, shown generally at 700 comprises a "flag" field 702, a "type" field 704, "cell-ID" field 706 and carrier to interference ratio (C/I) field 708. As per the RRAT the "flag" field signifies which operator that cell is associated with, and the "type" field signifies the type of base station controlling that cell. The Cell-ID field signifies the identity of the cell, and the C/I field provides the interference information.

BIMs can also be classified as an "incoming" BIM or an "outgoing" BIM.

Each cell maintains information on all the potential interfering cells and a corresponding conditional C/I value. This is called the incoming BIM. In addition to the incoming BIM, eNBs also maintain another BIM table that lists all the potentially interfered cells and the estimated potential C/I caused to each of them in case the same interfering component carrier is reused. This BIM is known as the outgoing BIM. At the same time an interfering cell entry is added or modified into the incoming BIM of the interfered cell (after a BIM update process), the corresponding interfered cell is added as an entry into the outgoing BIM of the interfering cell.

Often small cells of different operators are deployed in an overlapped way. When the available spectrum of a small cell is insufficient for the traffic, extra spectrum is necessary. However, the co-primary scenario may lead to extra interference, so BIM and RRAT exchange between small cells of different operators is necessary. As will be appreciated from FIG. 5, exchanging BIM and RRAT may be carried out in a number of ways. The following describes some ways in which this information may be transferred.

According to some embodiments new messages for the "enhanced" BIM and RRAT are proposed.

In this respect two new signaling messages are proposed for enhanced RRAT.

1) RRAT Measurement Indicator for Multiple Operators

If a node (e.g. MeNB, SeNB etc) receives the RRAT measurement indicator for multiple operators message, it will help the sending node set-up the RRAT. This message may includes the following parameters:

Operator flag: indicating which operator needs to be measured eNB ID: indicating which SeNB will feedback its radio resource allocation.

Other parameters: indicating the relevant information obtained by the small cell The message can be sent from SeNB to MeNB, or from SeNB to Spectrum controller, or from SeNB to Spectrum controller where MeNB acts as a relay through the backhaul link (e.g. IP network), or wireless interface.

2) RRAT Measurement Report for Multiple Operators

If one node receives the RRAT measurement report for multiple operators message, it can obtain the RRAT for its surrounding SeNBs for multiple operators. The message may include the following parameters:

Operator flag: indicating which operator needs to be measured

Small cell type flag: indicating different small cell types, e.g. 01-pico, 10-relay, 11-femtocell eNB ID: the SeNB identity Radio resource allocation information for the targeted SeNB Other parameters: indicating the relevant information the small cell obtained.

The message can be sent from MeNB to SeNB, or from Spectrum controller to SeNB, or from SeNB to UE, or from SeNB to MeNB, or from SeNB to Spectrum controller, or from SeNB to Spectrum controller where MeNB acts as a relay, or from MeNB to MeNB, or from Spectrum controller to Spectrum controller through backhaul link (e.g. IP network) or wireless interface.

Three new signaling messages are proposed for enhanced BIM:

1) BIM Measurement Indicator for Multiple Operators

If one node receives the BIM measurement indicator for multiple operators message, it may help the sending node set-up BIM. The message may include the following parameters:

Operator flag: indicating which operator needs to be measured

Bandwidth: indicating the bandwidth of the spectrum

Other parameters: indicating the relevant information obtained by the small cell.

2) Small-Cell Condition Report

A UE can read the channel information report to get the SeNB information through a wireless interface and the message may include following parameters:

The operator flag: indicating which operator needs to be measured

The small cell type flag: indicating the different small cell types, e.g. 01-pico, 10-relay, 11-femtocell eNB ID: the SeNB identity Other parameters: indicating the relevant information obtained by the small cell.

3) Background Interference Measurement Report for Multiple Operators

After the UE gets the measurement report of its surrounding neighbours, the UE may send a Background interference measurement report for multiple operators to its served SeNB and the message may include the following parameters:

Operator flag: indicating which operator needs to be measured

Small cell type flag: indicating the different small cell type, e.g. 01-pico, 10-relay, 11-femtocell eNB ID: the SeNB identity C/I: indicating the channel quality Other parameters: indicating the relevant information obtained by the small cell.

Two new signaling messages are also proposed for enhanced outgoing BIM:

1) Outgoing BIM Exchange Indicator for Multiple Operators

If a node receives the outgoing BIM exchange indicator for multiple operators message, it will add the small cell type to the message and forward the message to the next element. The message may include the following parameters:

Operator flag: indicating which operator needs to be measured eNB ID: the SeNB identity C/I: indicating the channel quality Other parameters: indicating the relevant information obtained by the small cell.

The message can be sent from SeNB to MeNB, or from SeNB to Spectrum controller, or from SeNB to Spectrum controller where MeNB acts as a relay through backhaul link (e.g. IP network) or wireless interface.

2) Outgoing BIM Report for Multiple Operators

If the node receives the Outgoing BIM report for multiple operators message, it can obtain the interference relationship between the source element and itself. The message may include the following parameters Operator flag: indicating which operator needs to be measured The small cell type flag: indicating the different small cell type, e.g. 01-pico, 10-relay, 11-femtocell eNB ID: the SeNB identity C/I: indicating the channel quality Other parameters: indicating the relevant information the small cell obtained.

The message can be sent from MeNB to SeNB, or from SeNB to Spectrum controller where MeNB acts as a relay, or from Spectrum controller to SeNB, or from SeNB to SeNB, or from MeNB to MeNB, or from Spectrum controller to Spectrum controller through backhaul link (e.g. IP network) or wireless interface.

RRAT measurement is discussed below with respect to FIGS. 8 to 13. The RRAT measurement can be carried out in a centralized manner (e.g. at the network by O&M or by MeNB), or in a distributed manner (e.g. by the UE or the SeNB).

In centralized embodiments it is supposed that the SeNBs cannot communicate with each other directly. As depicted in FIG. 5, there are three schemes for the centralized policy. For scheme 1, the message is forwarded through ①. For scheme 2, the message is forwarded through ③. For scheme 3, the message is forwarded through ① and ②. The following three parts are depicted to interpret the above three schemes.

FIG. 8 is a flow chart showing steps in accordance with an embodiment of RRAT measurement by MeNB in a centralized policy.

In FIG. 8 there is shown $SeNB_A$ 856, $MeNB_A$ 836, $MeNB_B$ 846 and $SeNB_B$ 860.

At step S1, when a small cell is powered on or reset or the traffic requirements have changed, the RRAT setup is triggered.

At step S2, if $SeNB_A$ 856 wants to (re-)select the component carrier, it will send indicator to $MeNB_A$ through backhaul network. This RRAT measurement indicator for multiple operators message includes the neighbour small cell's operator flag, eNB IDs, bandwidth, and so on.

At step S3, based on the operator flag from the small cell, the $MeNB_A$ 836 will make a selection. If the flag is set for the other operator (i.e. an operator other than the one the $MeNB_A$ 836 is currently utilizing), it will forward a request message and the next step is triggered.

At step S4 the $MeNB_A$ 836 forwards a RRAT of $SeNB_A$'s surrounding cell request to $MeNB_B$ 846 which includes $SeNB_A$'s surrounding cell IDs and bandwidth through X2 interface or wireless interface.

At step S5: Based on the eNB IDs, $MeNB_B$ 846 will make a selection for forwarding the RRAT request message.

At step S6 the $MeNB_B$ 846 sends RRAT request message to $SeNB_B$ 860 through the backhaul network.

At step S7 the $SeNB_B$ 860 receives its radio resource allocation information after it receives the RRAT request.

St step S8 the $SeNB_B$ 860 sends a RRAT report to $MeNB_B$ 846 which includes $SeNB_B$'s 860 small cell type flag, eNB ID, radio resource allocation information and so on through the backhaul network.

At step S9, when $MeNB_B$ 846 receives the RRAT report message, $MeNB_B$ 846 forwards the RRAT report message to $MeNB_A$ 836 which includes the $SeNB_B$ 860 eNB ID and small cell type through X2 interface or wireless interface.

At step S10, when $MeNB_A$ 856 receives the RRAT report message, it adds the operator flag of the message to RRAT measurement report and forwards a RRAT measurement report message to $SeNB_A$ 856 which includes $MeNB_B$'s 846 operator flag, eNB ID, small cell type and radio resource allocation information through the backhaul network. Based on the radio resource allocation information from small cells for different operators, it will setup a radio resource allocation information table (RRAT) for different operators.

FIG. 9 shows a flow chart for an embodiment where RRAT measurement is carried out by a spectrum controller (O&M) in a centralized policy.

Shown in FIG. 9 are $SeNB_A$ 956, Spectrum Controller A 932, Spectrum Controller B 942, and $SeNB_B$ 960. Steps 1 to 10 are equivalent to steps 1 to 10 shown in FIG. 8 except $MeNB_A$ 836 is replaced with spectrum controller A 932, and $MeNB_B$ 846 is replaced with spectrum controller B 942.

FIG. 10 shows RRAT measurement by MeNB and spectrum controller (O&M) according to a centralized policy. This is something of a combination of the embodiments shown in FIGS. 8 and 9. The embodiment of FIG. 10 comprises $SeNB_A$ 1056, $MeNB_A$ 1036, Spectrum Controller A 1032, Spectrum Controller B 1042, $MeNB_B$ 1046 and $SeNB_B$ 1060.

At step S1, when a small cell is powered on or reset or the traffic has changed, the RRAT setup is triggered.

At step S2, if $SeNB_A$ 1056 wants to (re-)select the component carrier, it will send indicator to $MeNB_A$ 1036 through the backhaul network. This RRAT measurement indicator for multiple operators message includes the neighbour small cell's operator flag, eNB IDs, bandwidth, and so on.

At step S3, if $MeNB_A$ 1036 receives the indicator message, it will forward the RRAT measurement indicator message to spectrum controller A 1032.

At step S4, based on the operator flag from the small cell, the $MeNB_A$ 1036 will make a selection. If the flag is for other operator (i.e. an operator other than the one $MeNB_A$ 1036 is currently using), it will forward a request message and the next step is triggered.

At step 5 the spectrum controller A 1032 sends a RRAT measurement request for multiple operators message to Spectrum controller B through the backhaul link, and the message includes eNB IDs, bandwidth and so on.

At step S6 after the spectrum controller B 1042 receives the request message, it will forward the RRAT measurement request for multiple operator message to MeNB$_B$ 1046 through the backhaul network.

At step S7 based on the eNB IDs, MeNB$_B$ 1046 will make a selection for forwarding the RRAT request message.

At step S8 MeNB$_B$ 1046 sends RRAT request message to SeNB$_B$ 1060 through the backhaul network.

At step S9 SeNB$_B$ 1060 receives its radio resource allocation information after it receives the RRAT request.

At step S10 SeNB$_B$ 1060 sends a RRAT report to MeNB$_B$ 1046 which includes SeNB$_B$'s 1060 small cell type flag, eNB ID, radio resource allocation information and so on through the backhaul network.

At step S11 when MeNB$_B$ 1046 receives the RRAT report message, it will forward the RRAT report message to Spectrum controller B 1042 which includes the SeNB$_B$'s eNB ID and small cell type through X2 interface or wireless interface.

At step S12 when Spectrum controller B 1042 receives the RRAT report message, it will forward the RRAT report message to Spectrum controller A 1032 which includes the SeNB$_B$'s 1060 eNB ID and small cell type through X2 interface or wireless interface.

At step S13 when Spectrum controller A receives the RRAT report message, it will add the operator flag of the message to RRAT measurement report and send RRAT measurement report for multiple operators to MeNB$_A$ 1036 which includes MeNB$_B$'s 1046 operator flag, eNB ID, small cell type and radio resource allocation information through the backhaul network.

At step S14 when MeNB$_A$ 1036 receives the RRAT measurement report for multiple operators message, it will forward a RRAT measurement report message to SeNB$_A$ 1056 which includes MeNB$_B$'s 1046 operator flag, eNB ID, small cell type and radio resource allocation information through the backhaul network. Based on the radio resource allocation information from small cells for different operators, it will setup a radio resource allocation information table (RRAT) for different operators.

FIG. 11 shows an embodiment with a distributed policy comprising the small cells.

In the distributed approach it is assumed that small cells of different operators receive others channel information. Therefore SeNB$_A$ 1156 gets the SeNB$_B$'s 1160 channel information by X2 interface or wireless interface.

Referring to FIG. 11, at step S1 the SeNB$_B$ 1160 sends the RRAT measurement report for multiple operators to SeNB$_A$ 1156 which includes operator flag, SeNB$_B$'s 1160 eNB ID, small cell type and the radio resource information.

At step S2 if SeNB$_A$ 1156 gets the radio resource information for small cells, it will setup RRAT.

FIGS. 12 and 13 show an embodiment of RRAT measurement comprising a distributed policy by UE.

The system framework is shown schematically in FIG. 12. A UE$_A$ 1266 is (at least potentially) in communication with SENB$_{A1}$ 1256, SeNB$_{A2}$ 1258, SeNB$_{A3}$ 1259, SeNB$_{B1}$ 1260 and SeNB$_{B2}$ 1262.

SENB$_{A1}$ 1256, SeNB$_{A2}$ 1258, SeNBA3 are controlled by operator A, and SeNB$_{B1}$ 1260 and SeNB$_{B2}$ 1262 are controlled by operator B.

Each of the SeNBs can access radio resource allocation information from RRAT 1200. In this embodiment the RRAT is stored in SeNB or MeNB. As depicted in FIG. 12 and FIG. 13, the UE$_A$ 1266 obtains the radio resource allocation information of its surrounding SeNBs or MeNBs, then UE$_A$ 1266 reports the information to SeNB$_{A2}$ 1258. Each SeNB has a type flag, an operator flag and component carrier information stored in the RRAT. The arrow between UE$_A$ 1266 and SeNB$_{A2}$ 1258 is representative of the transfer of radio resource allocation information from the UE$_A$ 1266 to the SeNB$_{A2}$ 1258, the radio resource allocation information relating to the SeNBs and MeNBs surrounding UE$_A$ 1266.

Now referring to FIG. 13, at step S1 SeNB$_{A1}$ 1356 sends a RRAT measurement indicator for multiple operators message to UE$_A$ 1366, and the message includes the operator flag information denoting which operator's small cell RRAT SeNB$_{A1}$ wishes to acquire and SeNB$_{B1}$'s 1360 eNB IDs denoting which small cell information SeNB$_{A1}$ 1356 wants to acquire.

At step S2 SeNB$_{B1}$ sends RRAT measurement report to UE$_A$ 1366. The message includes SeNB$_{B1}$'s operator flag 1360, eNB ID, small cell type flag and its radio resource allocation information.

At step S3, after UE$_A$ 1366 reads the RRAT measurement report, it sends the RRAT measurement report for multiple operators to its served SeNB$_{A1}$ 1356, and the table includes SeNB$_B$'s operator flag, small cell type flag and eNB ID.

The BIM set-up will now be described with respect to FIGS. 14 to 19.

For the "incoming" BIM a distributed strategy by UE is introduced. The policy can obtain accurate component carrier interference couplings. Accordingly in embodiments the UE gets the BIM by handover measurement, so it does not have extra signaling overhead.

FIG. 14 shows a BIM representative of multiple operators, according to an embodiment. Each cell maintains information on all the potential interfering cells and a corresponding conditional carrier to interference (C/I) value. This is referred to as the "incoming" BIM. The C/I value is a measure of mutual interference coupling between a pair of cells, in case the interfered cell and the interfering cell use the same component carrier simultaneously. This value is estimated as follows. For each active UE connected to the cell, the reference signal received power (RSRP) measurements are reported. These measurements are conducted both towards the serving cell and the surrounding cells. The conditional C/I, expressed in decibels, describes the RSRP difference between the serving cell and the surrounding cells. Hence, based on the RSRP measurements reported from the different UEs, an empirical C/I distribution is built locally within each eNB. The values in the locally stored BIM can be updated either periodically or event based as illustrated in FIG. 14.

In FIG. 14 the UE measurement reports are shown at 1480. As shown the measurement reports comprise the RSRP of the serving cell, as well as the RSRP of the surrounding cells.

Each "other cell" identified in the UE measurement report comprises the operator flag and the cell type indicator. This information is stored at the UE.

The information is then sent from the UE to the SeNB, where it is stored in a form as shown at 1482. That is each cell identified is appended with C/I information, as well as the operator flag and the cell type identifier. The C/I value can then be compared with that of the serving cell and expressed in dB, as shown at 1484. The C/I value stored in the BIM for each surrounding cell is the value corresponding to a certain outage of, for example, 90%. So if the eNB updates the BIM, the percentile may be different.

Referring now to FIG. 15, the incoming BIM setup is explained in further detail.

At step 1 the SeNB$_{A1}$ 1356 sends a BIM measurement indicator for multiple operators message to UE for the SeNB channel information associated with itself.

At step S2 the UE$_A$ 1366 reads small cell condition report message which includes SeNB ID, small cell type flag and operator flag. It autonomously detects the signals of surrounding small cells and records the cell IDs and operator flags with the corresponding signal strengths. It should be noted that in some embodiments, before the UE$_A$ 1566 has access to SeNB$_{A1}$ 1556, it measures the channel information around it. After the UE 1556 accesses SeNB$_{A1}$ 1556, it reports the channel information of surrounding SeNBs. In this embodiment during this process the UEA 1566 cannot actually access SeNB$_{B1}$ 1560, as represented by the dotted arrow.

At step S3 the UE$_A$ 1366 sends the Background Interference Measurement report for multiple operators to SeNB$_{A1}$ and the table includes SeNB$_{B1}$'s 1560 operator flag, small cell type flag, eNB ID and C/I.

The procedure for outgoing BIM will now be described with respect to FIGS. 16 to 18. The procedure for outgoing BIM comprises a centralized policy. Referring back to FIG. 5, again suppose that the SeNBs cannot directly communicate with each other. As shown in FIG. 5 there are three schemes for this policy. For scheme 1, the message is forwarded through ①. For scheme 2, the message is forwarded through ③. For scheme 3, the message is forwarded through ① and ②. The following three parts are depicted to interpret the above three schemes.

Referring now to FIG. 16, at step S1 when SeNB$_B$ 1660 gets its incoming BIM, it will exchange BIM with its relative small cells.

At step S2 SeNB$_B$ 1660 sends an outgoing BIM exchange indicator for multiple operators message to MeNB$_B$ 1646 which includes the targeted operator flag, eNB IDs and C/I.

At step S3, based on operator flag, MeNB$_B$ 1646 will make a selection of operator according to the operator flag. The cell information in incoming BIM may belong to the other operator. If the flag is for the other operator (i.e. an operator other than the one MeNB$_B$ 1646 is currently using), it will forward a report message and the next step is triggered.

At step S4 MeNB$_B$ 1646 sends outgoing BIM report for multiple operators message to MeNB$_A$ 1636 through X2 interface or wireless interface. The message includes the eNB IDs, small cell type of SeNB$_B$ 1660, SeNB$_B$'s 1660 operator flag, C/I, and so on.

At step S5, based on the eNB ID, MeNB$_A$ 1636 will select the target eNBs for forwarding the report message.

At step S6 MeNB$_A$ 1636 sends the outgoing BIM exchange report to SeNB$_A$ 1656 which include SeNB$_B$'s 1660 eNB ID, small cell type flag and operator flag, C/I, and so on.

FIG. 17 shows the procedure for centralized policy for outgoing BIM by spectrum controller (O&M). In this embodiment the steps 1 to 6 are the same as in FIG. 16, however in comparison with FIG. 16 the MeNB is replaced with the spectrum controller.

FIG. 18 shows the centralized policy for outgoing BIM by MeNB and Spectrum Controller (O&M). This is something of a combination of the embodiments of FIGS. 16 and 17.

At step S1, when SeNB$_B$ 1860 gets its incoming BIM, it will exchange BIM with its relative small cells.

At step S2: SeNB$_B$ 1860 sends an outgoing BIM exchange indicator for multiple operators message to MeNB$_B$ 1846 through the backhaul network. The message includes the operator flag and eNB ID of the target SeNB (i.e. the SeNB for which we want information) and C/I.

At step S3 when MeNB$_B$ 1846 receives the exchange indicator message, it sends Outgoing BIM indicator for multiple operators message to Spectrum controller B 1842 through the backhaul network. The message includes eNB ID of the target SeNB and small cell type flag of SeNB$_B$ 1860

At step S4, based on operator flag, Spectrum controller B 1842 will make a selection for forwarding message. If the flag is for other operator, it will forward a report message to another operator and the next step is triggered.

At step S5: Spectrum controller B 1842 sends outgoing BIM exchange report to Spectrum controller A 1832 through backhaul network. The message includes the eNB IDs, small cell type of SeNB$_B$ and C/I.

At step S6, based on eNB ID, Spectrum controller A 1832 will forward the Outgoing BIM exchange report to MeNB$_A$ 1836 which include eNB ID, small cell type flag and operator flag of SeNB$_B$ 1860 and C/I information.

At step S7, when MeNB$_A$ 1836 receives the outgoing BIM exchange report for multiple operators message, it will select the SeNB$_A$ 1856 for forwarding the report.

At step S8 MeNB$_A$ 1836 sends the outgoing BIM exchange report to SeNB$_A$ 1856 which includes eNB ID, small cell type flag and operator flag of SeNB$_B$ and C/I information.

A distributed policy by the small cell for outgoing BIM is shown in FIG. 19.

At step S1 when SeNB$_B$ 1960 gets its incoming BIM, it will exchange BIM with its relative small cells.

At step S2: SeNB$_B$ 1960 sends the outgoing BIM report for multiple operators message to SeNB$_A$ 1956 which includes SeNB$_B$'s 1960 eNB ID, small cell type and operator flag and so on.

At step S3, if SeNB$_A$ 1956 gets BIM information, it will setup BIM.

It will be appreciated that some embodiments may enable efficient resource allocation in a co-primary sharing scenario. The cell type flag may facilitate adaptive spectrum allocation. Furthermore, the operator flag may solve the confusion and conflict for small cells of different operators together with eNB ID. The signaling overhead of the scheme may be small. The signaling may also be applicable for other issues e.g. SON network, cell clustering and synchronization.

It is also noted herein that while the above describes exemplifying embodiments of the invention, there are several variations and modifications which may be made to the disclosed solution without departing from the scope of the present invention.

The required data processing apparatus and functions of a base station apparatus, a communication device and any other appropriate station may be provided by means of one or more data processors. The described functions at each end may be provided by separate processors or by an integrated processor. The data processors may be of any type suitable to the local technical environment, and may include one or more of general purpose computers, special purpose computers, microprocessors, digital signal processors (DSPs), application specific integrated circuits (ASIC), gate level circuits and processors based on multi core processor architecture, as non limiting examples. The data processing may be distributed across several data processing modules. A data processor may be provided by means of, for example, at least one chip. Appropriate memory capacity can also be provided in the relevant devices. The memory or memories may be of any type suitable to the local technical environment and may be implemented using any suitable data storage technology, such as semiconductor based memory devices, magnetic memory devices and systems, optical memory devices and systems, fixed memory and removable memory.

In general, the various embodiments may be implemented in hardware or special purpose circuits, software, logic or any combination thereof. Some aspects of the invention may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Some embodiments may be implemented by computer software executable by a data processor of the communication device, such as in the processor entity, or by hardware, or by a combination of software and hardware.

Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims. Indeed there is a further embodiment comprising a combination of one or more of any of the other embodiments previously discussed.

What is claimed is:

1. A method comprising:
   receiving, at a first cell, radio resource information from a second cell, said first and second cells in at least one network controlled by two or more operators;
   receiving operator identity information and cell-type information at said first cell from said second cell;
   storing, at the first cell, said radio resource information, said operator identity information, and said cell-type information in at least one of a radio resource allocation table (RRAT) and a background interference matrix (BIM), wherein at least one of said RRAT and BIM comprise a first field for signifying said cell-type information and a second field for signifying said operator identity information; and
   allocating radio resources shared between the first cell and the second cell in dependence on at least one of said RRAT and said BIM.

2. A method as set forth in claim 1, wherein said method comprises sending a request for said radio resource information, said request comprising said operator identity information for identifying an operator for which information is required.

3. A method as set forth in claim 1, wherein said radio resource information comprises at least one of spectrum allocation information and interference information.

4. A method as set forth in claim 1, wherein said cell-type information comprises information on a controller of said second cell.

5. A computer program product embodied on a non-transitory distribution medium readable by a computer and comprising program instructions which, when loaded into an apparatus, execute the method according to claim 1.

6. An apparatus comprising
   at least one processor;
   and at least one memory including computer program code;
   the at least one memory and the computer program code configured to, with the at least one processor, cause the apparatus at least to:
   receive, at the first cell, radio resource information from a second cell, said apparatus comprised in a first cell and said first and second cells in at least one network controlled by two or more operators;
   receive operator identity information and cell-type information from said second cell;
   store, at the first cell, said radio resource information, said operator identity information, and said cell-type information in at least one of a radio resource allocation table (RRAT) and a background interference matrix (BIM), wherein at least one of said RRAT and BIM comprise a first field for signifying said cell-type information and a second field for signifying said operator identity information; and
   allocate radio resources shared between the first cell and the second cell in dependence on at least one of said RRAT and said BIM.

7. An apparatus as set forth in claim 6, wherein said apparatus is configured to send a request for said radio resource information, said request comprising said operator identity information for identifying an operator for which information is required.

8. An apparatus as set forth in claim 6, wherein said radio resource information comprises at least one of spectrum allocation information and interference information.

9. An apparatus as set forth in claim 6, wherein said cell-type information comprises information on a controller of said second cell.

* * * * *